United States Patent
Lowery et al.

(10) Patent No.: US 8,112,001 B2
(45) Date of Patent: Feb. 7, 2012

(54) NON-LINEARITY COMPENSATION IN AN OPTICAL TRANSMISSION

(75) Inventors: Arthur James Lowery, Kew (AU); Liang Bangyuan Du, Clayton (AU)

(73) Assignee: Ofidium Pty, Ltd., Melbourne (AU)

( * ) Notice: Subject to any disclaimer, the term of this patent is extended or adjusted under 35 U.S.C. 154(b) by 0 days.

(21) Appl. No.: 12/445,386

(22) PCT Filed: Dec. 20, 2007

(86) PCT No.: PCT/AU2007/001973
§ 371 (c)(1),
(2), (4) Date: Sep. 10, 2009

(87) PCT Pub. No.: WO2008/074085
PCT Pub. Date: Jun. 26, 2008

(65) Prior Publication Data
US 2010/0247099 A1    Sep. 30, 2010

(30) Foreign Application Priority Data
Dec. 20, 2006    (AU) ............................... 2006907118

(51) Int. Cl.
*H04B 10/00* (2006.01)
*H04B 10/04* (2006.01)
*H04J 14/02* (2006.01)

(52) U.S. Cl. .......... 398/158; 398/79; 398/159; 398/192; 398/193; 398/194; 398/208

(58) Field of Classification Search .................... 398/79, 398/89, 99, 136, 137, 147, 149, 158, 159, 398/163, 183, 182, 185, 187, 192–194, 201, 398/208; 375/260, 316
See application file for complete search history.

(56) References Cited

U.S. PATENT DOCUMENTS
6,661,976 B1    12/2003 Gnauck et al.
(Continued)

FOREIGN PATENT DOCUMENTS
EP    2061198 A1    5/2009
(Continued)

OTHER PUBLICATIONS
Lowery et al: "Orthogonal Frequency Division Multiplexing for Adaptive Dispersion Compensation in Long Haul WDM Systems", OFC 2006, Mar. 5-10, 2006, paper PDP39, pp. 1-3.*
(Continued)

*Primary Examiner* — Li Liu
(74) *Attorney, Agent, or Firm* — Woodcock Washburn LLP

(57) ABSTRACT

A method of transmitting information over a non-linear optical channel includes the step (152) of generating an information-bearing signal, preferably an OFDM signal, which includes a plurality of closely-spaced sub-carriers in the frequency domain. A time-varying phase modulation is determined (154), which is a first function, and preferably a linear function, of the transmitted optical power corresponding with the information-bearing signal. The information-bearing signal and the time-varying phase modulation are applied (156) to an optical source in order to generate a corresponding transmitted optical signal having substantially the stated transmitted optical power characteristic. The first function of transmitted optical power is selected so as to mitigate the effect of the non-linearity of the optical channel upon the transmitted optical signal. In alternative arrangements, a time-varying phase modulation, being a second function of optical power, is computed (162) and applied (164) to a signal received following transmission through a non-linear optical channel. The two alternative arrangements provide, respectively, for pre-compensation and post-compensation of non-linear propagation effects that may be carried out entirely within the electrical domain, for example using digital signal processing techniques.

28 Claims, 9 Drawing Sheets

U.S. PATENT DOCUMENTS

| | | | |
|---|---|---|---|
| 7,013,089 B1 | 3/2006 | Ho et al. | |
| 7,173,551 B2 * | 2/2007 | Vrazel et al. | 341/144 |
| 2003/0161487 A1 * | 8/2003 | Husted et al. | 381/94.5 |
| 2005/0095007 A1 | 5/2005 | Odate et al. | |
| 2006/0013597 A1 * | 1/2006 | Crivelli et al. | 398/208 |
| 2006/0078336 A1 * | 4/2006 | McNicol et al. | 398/147 |
| 2007/0206954 A1 * | 9/2007 | Fishman et al. | 398/159 |
| 2009/0067833 A1 | 3/2009 | Bunge et al. | |
| 2009/0074415 A1 | 3/2009 | Xie | |
| 2009/0129257 A1 * | 5/2009 | Maltsev et al. | 370/208 |
| 2009/0290877 A1 | 11/2009 | Yu et al. | |
| 2009/0290878 A1 | 11/2009 | Yu et al. | |
| 2010/0086303 A1 | 4/2010 | Qian et al. | |
| 2010/0135656 A1 | 6/2010 | Khurgin et al. | |
| 2010/0142637 A1 | 6/2010 | Hu et al. | |

FOREIGN PATENT DOCUMENTS

| | | |
|---|---|---|
| EP | 2066044 A1 | 6/2009 |
| EP | 2071754 A1 | 6/2009 |
| EP | 2073474 A1 | 6/2009 |
| JP | 2005311722 A | 11/2005 |
| KR | 20100068388 A | 6/2010 |
| WO | 0217522 A2 | 2/2002 |
| WO | 200408883 A1 | 10/2004 |
| WO | WO 2004/088883 A1 | 10/2004 |
| WO | WO 2007/003590 A2 | 1/2007 |
| WO | WO 2007/041799 A2 | 4/2007 |
| WO | WO 2010/073990 A | 7/2010 |

OTHER PUBLICATIONS

Djordjevic, I.V. et al., "LDPC-coded OFDM in fiber-optics communication systems [Invited]," Journal of Optical Networking, Mar. 2008, 7(3), 217-226.

Shieh, W. et al., "High-Speed and High Spectral Efficiency Coherent Optical OFDM," IEEE, 2008, 115-116.

Jansen, S.L. et al., "10×121.9-Gb/s PDM-OFDM Transmission with 2-b/sHz Spectral Efficiency over 1,000 km of SSMF," Fiber Optics Communications, 2007, 3 pages.

Kazushige Yonenaga et al., "100 Gbit/s All-Optical OFDM Transmission Using 4×25 Gbit/s Optical Duobinary Signals with Phase-Controlled Optical Sub-Carriers," IEEE OFC/FOEC 2008, 3 pages.

Dixon et al., "Orthogonal Frequency-Division multiplexing in wireless Communications Systems with Multimode Fiber Feeds", Trans Microwave Theory and Techniques, 49(8), Aug. 8, 2001, 6 pages.

Giacoumidis et al., "Adaptive-Modulation-enabled WDM Impairment reduction in Multichannel Optical OFDM Transmission Systems for next-generation PONs", IEEE Photonics Journal, 2(2), Apr. 2010, 12 pages.

Giddings et al., "Colourless real-time Optical OFDM end-to-end Transmission at 7.5 Gb/s over 25 km SSMF using 1 GHz RSOAs fro WDM-PONs", OFC/NFOEC 2010, 978-1-55752-884-1/10 ©2010, School of Electronic Engineering Bangor University, 3 pages.

Jin, "Real-Time Demonstration of 128-QAM encoded Optical OFDM Transmission with a 5.25 bit/s/Hz Spectral efficiency in Simple IMDD Systems Utilizing Directly Modulated DFB Lasers", Optics Express, 17(22), Oct. 26, 2009, 10 pages.

Jolley et al., "Generation and Propagation of a 1550 nm 10 Gbits/s Optical Orthogonal Frequency Division Multiplexed Signal over 1000 m of multimode fibre using a directly modulated DFB", Optical Fibre Communications Conference, Mar. 6-10, 2005, 3 pages.

Meslener, "Chromatic Dispersion induced Distortion of Modulated Monochromatic Light employing direct Detection", Journal of Quantum Electronics, QE-20(10), Oct. 1984, 9 pages.

Schuster et al., "Spectrally Efficient Compatible Single-Sideband Modulation for OFDM Transmission with Direct Detection", Photonics Technology Letters, 20(9), May 1, 2008, 3 pages.

Tang et al., "30 Gb/s Signal Transmission over 40-km directly Modulated DFB-laser based single-mode-fiber links without Optical Amplification and dispersion Compensation", Journal of Lightwave Technology, 24(6), Jun. 2006, 10 pages.

Tang et al., "Maximizing the Transmissions Performance of Adaptively Modulated Optical OFDM Signals in Multimode fiber links by Optimizing Analog-to-Digital Converters", Journal of Lightwave Technology, 25(3), Mar. 2007, 12 pages.

Wei et al., "The Influence of Directly modulated DFB lasers on the Transmission Performance of Carrier-Suppressed Single Sideband Optical OFDM Signals over IMDD SMF Systems", Journal of Lightwave Technology, 27(13), Jul. 1, 2009, 8 pages.

* cited by examiner

NON-LINEARITY COMPENSATION IN AN OPTICAL TRANSMISSION

CROSS REFERENCE TO RELATED APPLICATIONS

This application is the US national phase of PCT/AU2007/001973, filed on Dec. 20, 2007, which is based on Australian Application No. 2006907118, filed Dec. 20, 2006.

FIELD OF THE INVENTION

The present invention relates generally to optical communications, and more particularly to methods and apparatus for the generation, transmission, detection and decoding of optical signals in order to compensate for the effects of optical non-linearities existing in optical channels, and particularly optical fibres, which affect the quality of signals transmitted at high power levels and/or over long distances.

BACKGROUND OF THE INVENTION

Optical transmission, in which an information signal is modulated onto an optical carrier, is widely employed in modern communication systems. In particular, wide-area communications networks employ long-haul transmission links using single-mode optical fibres for the transmission of digital information at very high bit rates, using one or more optical carriers, or wavelengths, over each fibre. The distance over which data may be transmitted in single-mode optical fibres before some form of regeneration is required may be limited by optical attenuation and/or various dispersion mechanisms. The advent of practical optical amplifiers has substantially eliminated the loss limitation, particularly for systems operating in the third optical communications window at wavelengths around 1550 nm, in which erbium-doped fibre amplifiers are applicable.

Furthermore, linear dispersion processes, such as chromatic dispersion, may be compensated at any convenient point in a transmission system, and in principle to any desired degree of precision, using a variety of linear means. For example, applicable dispersion compensation techniques include the use of dispersion compensating fibre (DCF) and/or other dispersive optical elements selected and configured to provide an inverse dispersion characteristic to that of the transmission fibre. International patent application no. PCT/AU2006/001511 is directed to methods of dispersion compensation that may be performed in the electronic domain, using processing at the transmitting and/or receiving end of an optical link, and in particular discloses a method utilising block coding of digital information, single sideband optical transmission, and frequency domain equalisation of the resulting received signal, in order to provide complete compensation of linear dispersion in the electronic domain. This latter approach is particularly conveniently implemented using orthogonal frequency division multiplexing (OFDM) methods for the encoding and decoding of the electrical signals.

While the levels of optical non-linearity existing in most practical transmission media, and in silica glass in particular, are relatively low, the optical intensities arising in the core of waveguide structures formed in such materials, eg single-mode optical fibres, can be very high. This is particularly true in long-haul optical transmission systems, where there is an inherent trade-off between the peak optical power (ie intensity within the single-mode fibre core) and the overall system cost. Specifically, in order to maintain a high optical signal-to-noise ratio the propagating signal power must be maintained at a sufficiently high level at the input to each optical amplifier in the system. The spacing between amplifiers may be increased by launching higher optical power into the fibre spans at the output of the transmitter, and of each amplifier. However, the use of high launch powers increases the effect of optical non-linearities, resulting in higher optical signal distortion, which ultimately limits the received signal quality, and thus the maximum transmission distance achievable before the signal must be detected, recovered and regenerated. It is therefore useful to mitigate the effects of fibre non-linearity, so that the number of optical amplifiers used within a transmission link of given lengths may be reduced, and/or to enable the total unregenerated transmission length to be increased.

Compensating for non-linear transmission impairment is generally more difficult than compensating for linear processes such as chromatic dispersion. Whereas a distributed linear process may be exactly modelled as an equivalent lumped component, and compensated using lumped elements, distributed non-linear processes cannot generally be treated as equivalent lumped components, or precisely inverted at a single point within a system. Nonetheless, in appropriate circumstances such an approach provides a useful first-order approximation enabling the effects of optical non-linearities to be somewhat mitigated. However, past attempts to apply this idea have proven to be impractical, computationally difficult, and/or have provided only relatively small improvements in received signal quality.

According to one prior art approach, it has been proposed to compensate for non-linear distortion by using substantially lumped elements composed of materials having a negative non-linear coefficient, which is an analogous approach to the use of DCF for the compensation of linear chromatic dispersion. Unfortunately, it has thus far proven impractical to manufacture and deploy components utilising materials with the required non-linear properties. An alternative prior art approach is to implement an equivalent negative non-linear effect within an electronic pre-compensation system. The difficulty with this approach is that it is initially necessary to determine the required characteristics of the effective negative non-linearity. Given a sufficiently detailed knowledge of the transmission system, including the characteristics of all of the fibre spans, and the transmitted optical power levels, it is possible in principal to compute the properties of a corresponding "inverse" fibre model. Computer simulation techniques may then be used to propagate the transmitted optical signals through the inverse system model, whereby the computed output of this model is used as the input to the real system. This approach is limited by the difficulties inherent in obtaining sufficiently accurate information regarding the actual transmission system, and also by the high computational complexity of modelling the inverse system.

Accordingly, simplified approaches to pre-compensation of optical non-linearity have been proposed. According to one such approach, a constant optical phase shift is applied to each bit of a transmitted optical signal utilising a base-band return-to-zero (RZ) modulation format, wherein the phase shift is dependent only upon the two adjacent bits. In another proposal, a simplified calculation is utilised for the inverse system model, using only a single step of a conventional split-step fibre propagation model in order to represent up to two fibre spans.

Other prior art approaches have employed optical non-linearity compensation at the receiving end of a transmission system. These are generally relatively complex approaches utilising non-linear feedback systems, or the use of optical modulators operated in response to the received optical power in order to simulate a negative non-linear coefficient.

Accordingly, there remains a need for further alternative and/or improved methods and apparatus for compensating for non-linear effects in long-haul optical transmission systems. It is highly desirable that new techniques be developed which avoid the need for expensive, exotic and/or complex additional optical components to be deployed, and which enable computationally efficient compensation in the electrical domain. It is therefore an object of the present invention to provide such methods and apparatus, or at least to mitigate some of the aforementioned disadvantages of prior art approaches.

SUMMARY OF THE INVENTION

In one aspect, the present invention provides a method of transmitting information over a non-linear optical channel, including the steps of:

generating an information-bearing signal including a plurality of closely-spaced sub-carriers in a frequency domain;

determining a time-varying phase modulation which is a first function of a transmitted optical power characteristic corresponding with said information-bearing signal; and applying the information-bearing signal and the time-varying phase modulation to an optical source to generate a corresponding transmitted optical signal having substantially said transmitted optical power characteristic, wherein said first function of transmitted optical power is selected so as to mitigate the effect of the non-linearity of the optical channel upon the transmitted optical signal.

Advantageously, the use of an information-bearing signal which is made up of closely-spaced sub-carriers results in a corresponding optical signal whose spectrum includes similarly closely-spaced sub-carriers. As will be appreciated, due to the close packing of the sub-carrier channels the difference in optical propagation speed, or delay, between adjacent sub-carriers, resulting from dispersion of the optical channel, is substantially negligible. While this may aggravate the effect of non-linear processes arising between adjacent sub-carriers, it also enables a substantial simplification in the system propagation model. In particular, by neglecting the effect of linear dispersion between adjacent channels, the system may be approximately modelled using only a single step of the usual split-step algorithm. The single step simply applies a phase modulation to the optical signal, wherein the instantaneous phase is a relatively simple function of the instantaneous optical power. In particular, as the "single step" approximation becomes more accurate (eg under conditions of low optical dispersion, small optical signal bandwidth, and/or extremely close packing of optical sub-carriers) the instantaneous phase is simply proportional to the instantaneous optical power.

In the most preferred embodiments, the information to be transmitted over the non-linear optical channel is digital information, and the step of generating the information-bearing signal includes:

mapping the digital information to a series of symbol values, each of which corresponds with one or more bits of the digital information modulated onto one of said plurality of sub-carriers; and applying a frequency/time transformation to generate a corresponding time sequence of signal values.

Most preferably, this step is performed in accordance with an orthogonal frequency division multiplexing (OFDM) method. Advantageously, methods and apparatus for generating suitable OFDM signals are well-established within the electronic communication arts, and accordingly are readily available for deployment in embodiments of the present invention. In accordance with conventional OFDM techniques, an inverse Fast Fourier Transform (FFT) may be used to apply the required frequency/time transformation, whereby the input to the FFT consists of the symbols to be modulated onto a corresponding plurality of sub-carriers, and the output is a time domain sequence of signal values, the spectrum of which includes a plurality of closely-spaced sub-carriers in the frequency domain.

In order to generate a continuous, time-varying, information-bearing signal suitable for modulating the optical source, the method preferably further includes performing a parallel-to-serial conversion of the values output from the frequency/time transformation, and a digital-to-analog conversion of the serial sequence of signal values.

An additional advantage of utilising a frequency/time transformation, such as an inverse FFT in accordance with an OFDM approach, is that it is possible, if desired, to additionally incorporate frequency domain equalisation for compensation of linear dispersion, such as chromatic dispersion at the transmitting and/or receiving end of the optical channel. Suitable methods and apparatus for performing such dispersion equalisation are disclosed in international patent application no. PCT/AU2006/001511, which is hereby incorporated herein in its entirety by reference.

Application of the time-varying phase modulation may be performed either in the electrical domain, or in the optical domain. For example, in some embodiments of the invention the step of applying the information-bearing signal and the time-varying phase modulation to the optical source includes first applying the information-bearing signal to the optical source, for example using an appropriate optical modulator, and subsequently applying the time-varying phase modulation to the resulting optical signal, such as by passing the optical signal though an optical phase modulator to which the time-varying phase modulation drive signal is applied.

However in alternative, and presently preferred embodiments, the step of applying the information-bearing signal and the time-varying phase modulation to the optical source is performed by first applying the time-varying phase modulation to the time sequence of signal values, and applying the resulting phase-modulated signal to the optical source, for example using an appropriate optical modulator. As will be appreciated, the application of the time-varying phase modulation to the time sequence of signal values may be performed prior to parallel-to-serial conversion, thus enabling this signal processing function to be performed in parallel, and accordingly at a reduced processing rate.

In various embodiments of the invention, different optical modulation formats may be utilised. According to particularly preferred embodiments, the transmitted optical signal consists of a single optical sideband having a completely suppressed optical carrier, which may be detected at the receiving end of a transmission system utilising coherent optical detection techniques. A suitable optical single sideband-suppressed carrier (OSS-SC) signal may be directly generated using a specialised optical IQ modulator. Alternatively, conventional intensity modulation may be employed, along with appropriate optical filtering to select a single sideband for transmission, and to suppress the optical carrier.

According to alternative embodiments, the optical carrier may not be totally suppressed, and may be wholly retained or only partially suppressed, such that incoherent detection techniques may be used at the receiving end. If the optical carrier is wholly, or partially, retained in the transmitted signal, the effect of the optical carrier upon the total transmitted optical power may optionally be taken into account in determining the time-varying phase modulation to be applied to the transmitted optical signal. Furthermore, the phase modulation may be applied to the sub-carriers only, (eg in the electrical domain), or may be applied to both the sub-carriers and the optical carrier (eg in the optical domain).

As summarised in the foregoing paragraphs, embodiments of the invention provide a method for pre-compensation of optical signals for transmission over a non-linear optical channel. According to preferred embodiments of the invention, post-compensation (ie compensation at the receiving end) may also be applied. In such embodiments, the method further includes the steps of:

detecting the transmitted optical signal after propagation over the non-linear optical channel to produce a corresponding received time varying electrical signal:

determining a further time-varying phase modulation which is a second function of an optical power characteristic corresponding with said received signal;

applying said further time-varying phase modulation to said received signal; and recovering the transmitted information from the resulting phase-modulated received signal, wherein said second function of optical power is selected so as to further mitigate the effect of the non-linearity of the optical channel on the transmitted optical signal.

Advantageously, while pre-compensation or post-compensation alone may provide some improvement in received signal quality due to the mitigation of the effects of optical non-linearities in the optical transmission channel, an optimum, or near-optimum, combination of pre- and post-compensation may enable further improvements in received signal quality, maximum amplifier spacing, and/or total unregenerated transmission distance.

According to particularly preferred embodiments of the invention, in which the single step approximation of the transmission system model is applicable, the first and/or second functions of optical power are linear functions, whereby the time-varying phase modulation consists of a phase shift which is proportional to instantaneous transmitted or received optical power. As will be appreciated, this represents a particularly simple and computationally efficient compensation function, as compared with prior art methods. Further improvements in compensation for optical non-linearities may be achieved by using alternative functions of the optical power, such as polynomial functions (eg quadratic functions), functions incorporating memory or time-delay, filter-type functions (which enable additional functionality, such as pre-emphasis, to be applied), and so forth.

Typically, the non-linear optical channel consists of a plurality of concatenated optical fibre spans having optical amplifiers disposed therebetween in order to boost the optical signal power as compensation for attenuation within each fibre span. In this particular case, the phase shift is preferably computed as a sum over all spans of the instantaneous optical power at the input of each span, multiplied by a constant which is characteristic of the non-linear properties of the optical fibre making up the corresponding span, multiplied again by an effective length of the span. The concept of an effective length, as applied to non-linear transmission, is known in the art, and is related to the fibre loss and the span length. In general, the effective length accounts for the fact that non-linear processes are more significant towards the input end of each span, where the optical power level is greater. Non-linear processes become less significant as signals are attenuated along the span. Accordingly, the effective length of a fibre span is generally less than the actual physical length of the span.

In the particularly simple case in which all spans within a given transmission link are identical, the phase shift may be computed as the product of the transmitted optical power, a single constant characteristic of the non-linear properties of all fibre spans, the common effective length of all fibre spans, and the number of spans.

In any case, it is not necessary for the actual characteristics of the transmission link to be known precisely, rather an initial estimate may be obtained based upon an approximate characterisation of the link, which may then be "tuned" by varying the resulting value until a maximum received signal quality is achieved.

More particularly, in systems employing both pre- and post-compensation, the parameters characterising both the pre-compensation function (ie the first function of transmitted optical power), and the post-compensation function (ie the second function of optical power) may be adjusted to achieve an optimal division of compensation between pre- and post-compensation, for which a maximum received signal quality is achieved.

In another aspect, the present invention provides a transmitter for use in transmitting information over a non-linear optical channel, the transmitter including:

a signal generator, adapted to generate an information-bearing signal including a plurality of closely-spaced sub-carriers in a frequency domain;

means for determining a time-varying phase modulation which is a function of a transmitted optical power characteristic corresponding with said information-bearing signal;

an optical source for generating an optical carrier wave; and at least one modulation means arranged to apply the information-bearing signal and the time-varying phase modulation to said optical carrier wave, to generate a corresponding transmitted optical signal having substantially said transmitted optical power characteristic, wherein said function of transmitted optical power is selected so as to mitigate the effect of the non-linearity of the optical channel upon the transmitted optical signal.

Preferably, the information is digital information, and the signal generator is configured to map the digital information to a series of symbol values, each of which corresponds with one or more bits of the digital information modulated onto one of said plurality of sub-carriers, and the signal generator is further configured to apply a frequency/time transformation to said series of symbol values, to generate a time sequence of signal values.

In accordance with preferred embodiments of the invention, the signal generator includes digital electronic hardware components, and may also include memory devices containing program instructions for execution by a digital processor for implementing functions of the signal generator. In particular, the signal generator may include a digital signal processor coupled to memory devices including corresponding software components for execution by the processor.

In particularly preferred embodiments, the signal generator is configured to generate said information bearing signal in accordance with an OFDM method. The signal generator also preferably includes a parallel-to-serial converter for converting a parallel output of the frequency/time transformer into a corresponding serial time sequence of signal values. The signal generator also preferably includes a digital-to-analog converter arranged to receive the time sequence of signal values at an input thereof, and to produce a continuously time-varying output signal suitable for driving the modulation means.

In preferred embodiments, the means for determining a time-varying phase modulation includes digital hardware components and/or memory devices containing software instructions for execution by a corresponding processor, for computing the function of a transmitted optical power characteristic corresponding with the information-bearing signal. As will be appreciated, however, the function may be implemented wholly or in part using analog electronic components, and/or a combination of analog and digital components, particularly in embodiments in which the time-varying phase modulation has a simple functional form.

In a particularly preferred, and computationally efficient, embodiment of the invention, the modulation means includes digital modulation means, such as a hardware or software multiplier, which is configured to apply the phase modulation to the time-sequence of signal values generated in the digital domain. Such digital modulation may be applied to the parallel outputs of the frequency/time transformer, and accordingly in appropriate hardware implementations the modulation may be performed computationally in parallel, thus increasing the potential processing throughput of the digital modulator.

In alternative embodiments, the modulation means may include an optical phase modulator arranged to apply the phase modulation directly to the optical signal prior to transmission over the non-linear optical channel.

In the presently envisaged embodiments of the invention, the at least one modulation means also includes an optical modulator arranged to apply the information-bearing signal (either with or without the phase modulation previously applied in the digital/electronic domain) to the optical carrier wave. As will be appreciated by those skilled in the art of optical communications, various suitable optical modulation means are available for performing this function. A particularly simple arrangement involves the direct application of the continuously time-varying electrical information-bearing signal to an optical source, such as a laser diode. However, this form of direct modulation generally involves various technical problems, including limitations of modulation bandwidth, frequency response, and chirp of the output optical signal. Accordingly, it is generally preferred in the present invention to employ external optical modulators, such as lithium niobate or semiconductor Mach-Zehnder modulators, electro-absorption modulators, or other specialised types of modulators, some of which are particularly advantageous as described further below.

It is particularly convenient for the transmitted optical signal to include only a single information-bearing optical sideband. This may be achieved through the use of specialised modulators, such as the IQ modulator discussed in greater detail below, or by using an optical intensity modulator, which produces a dual sideband output, and then utilising an optical filter, or similar means, to reject one optical sideband.

The modulation means may also be arranged to totally or partially suppress the optical carrier wave in the transmitted optical signal. Again, carrier suppression may be performed using a specialised optical modulator, such as an IQ modulator, or by the use of an optical filter or similar means to reject the optical carrier. Simulations conducted by the inventor to date suggest that optimum performance of the non-linear compensation scheme may be achieved by transmitting a signal without a corresponding optical carrier, and optimising the non-linear compensation in order to produce a substantially maximum quality received optical signal. However, transmitting a signal with a totally suppressed optical carrier requires that coherent detection methods be used at the receiving end, further requiring the provision of a frequency stable optical local oscillator (such as a further laser source) at the receiver. Since such coherent detection schemes involve additional complexity, it may be more practical in some embodiments to include an optical carrier within the transmitted optical signal, so that coherent detection is not required at the receiver. Simulations conducted to date by the inventor have demonstrated that such embodiments of the invention are able to provide significant improvements in received signal quality, although optimised embodiments employing coherent detection may provide further improved performance.

According to particularly preferred embodiments of the transmitter, the optical modulator is an IQ modulator, as has previously been mentioned. An IQ modulator, which is an "in-phase/quadrature" modulator or "complex" modulator, includes two electrical drive inputs, conventionally identified as I and Q respectively. The IQ modulator may be used to apply simultaneously both amplitude and phase modulation to the optical carrier wave. In particular, the I input is driven with an electrical signal corresponding with the real part of a complex valued sequence of information-bearing signal values, while the Q input is driven with the corresponding imaginary part of the signal values. Accordingly, in embodiments employing the IQ optical modulator, the signal generator is a digital signal generator adapted to operate using complex valued digital samples, which produces an output consisting of a time sequence of complex signal values. The signal generator may then include dual parallel-to-serial converters and/or digital-to-analog converters, for separately generating continuous time-varying waveforms corresponding respectively with the real component of the information-bearing signal and the imaginary component of the information-bearing signal. The dual continuous time-varying waveforms are then applied respectively to the I and Q inputs of the IQ modulator. Such embodiments therefore enable complete control over the amplitude and phase modulation applied to the optical carrier wave. The resulting optical signal may be single or dual sideband, and with or without a residual optical carrier, depending upon the configuration of the signals driving the IQ modulator. The phase modulation is preferably applied in the electrical domain, more preferably in the digital domain, and most preferably in parallel in order to maximise the potential throughput of the transmitter.

In another aspect, the present invention provides a receiver for use in receiving information that has been transmitted over a non-linear optical channel, the receiver including:

an optical detector arranged to detect a received optical signal corresponding with an information-bearing signal including a plurality of closely-spaced sub-carriers in a frequency domain, which has been modulated onto an optical carrier, and transmitted over the non-linear optical channel;

means for determining a time-varying phase modulation which is a function of a received optical power characteristic corresponding with said received information-bearing optical signal;

at least one modulation means arranged to apply said time-varying phase modulation to said received signal; and a signal decoder adapted to recover the transmitted information from the resulting phase-modulated received signal, wherein said function of received optical power is selected so as to mitigate the effect of the non-linearity of the optical channel on the received optical signal.

As will be appreciated by those skilled in the art of optical communications, the most advantageous form of the optical detector may depend upon the characteristics of the received optical signal. The detector may include, for example, a PIN photo diode, or an Avalanche Photo Detector (APD). The detector may be incorporated into a direct detection system, a pre-amplified direct detection system, or a coherent detection system, according to requirements. In particular, if the received optical signal does not include an optical carrier, then it will be necessary for the detector to include a local optical oscillator, such as a suitable laser source, to provide coherent detection of the received signal. In other embodiments, if the received optical signal is a conventional intensity modulated signal, including dual sidebands and an optical carrier, then the detector may require an optical filter to eliminate one of the optical sidebands prior to detection, in order to make the relevant optical phase information of the optical signal available to the electrical components of the receiver following the optical detector. Further detector arrangements suitable for a variety of different implementations of the corresponding optical transmitter will be apparent to persons skilled in the art.

In accordance with a preferred embodiment, the receiver includes an analog-to-digital converter coupled to an output of the optical detector, the analog-to-digital converter receiving a continuous time-varying electrical signal at an input thereof, and producing a corresponding time sequence of received signal values at an output. The receiver preferably further includes a serial-to-parallel converter for converting the time sequence of received signal values into a corresponding parallel series of values. The receiver may incorporate digital hardware and/or memory devices including software instructions for execution by a digital processor coupled thereto, for processing of the received signal values.

In particular, in preferred embodiments the receiver includes digital hardware and/or software configured to compute said function of the optical power characteristic corresponding with the received signal, and digital modulation means, such as a hardware or software multiplier, configured to apply the resulting phase modulation to the time sequence of received signal values. Advantageously, the processing capacity and throughput of the receiver signal processing may be increased by applying the phase modulator to the received signal values in parallel.

The signal decoder, which is preferably also implemented using digital hardware and/or software of the receiver, preferably includes a time/frequency transformer, for converting the received and phase-modulated signal values into a series of corresponding symbol values in a frequency domain. In preferred embodiments, each of said symbol values corresponds with one or more bits of digital information that has been transmitted over the non-linear optical channel. Typically, the non-linear optical channel will also exhibit a linear dispersion characteristic, such as due to chromatic dispersion, and it is therefore preferred to apply a corresponding dispersion compensation to the frequency domain symbol values, for example in accordance with the methods and apparatus described in international application no. PCT/AU2006/001511.

In accordance with preferred embodiments of the receiver, the signal decoder is further adapted to recover a series of compensated received symbol values, following time/frequency transformation and/or dispersion compensation, each of said compensated received signal values corresponding to one or more bits of the original transmitted digital information.

In yet another aspect, the present invention provides a system which includes a transmitter and a receiver, in accordance with previously described aspects of the invention, and having a non-linear optical channel disposed therebetween, for conveying optical signals from the transmitter to the receiver. In preferred embodiments, the non-linear optical channel includes a plurality of optical fibre spans, having optical amplifiers disposed therebetween.

In particularly preferred embodiments the system includes both pre-compensation (ie compensation at the transmitter) and post-compensation (ie compensation at the receiver) in order to mitigate the effect of the non-linearity of the optical channel upon the transmitted optical signal. In particular, an optimisation process may be performed in order to identify the required levels of phase modulation to be applied at the transmitter and the receiver in order to provide a substantially improved overall non-linear compensation, as compared with compensation at the transmitter or the receiver alone.

However, it will be appreciated that improvements in received signal quality may be achieved using only pre-compensation or only post-compensation, and that such arrangements are also within the scope of the present invention. In particular, the relative benefits of pre- and post-compensation have been found to depend upon the particular optical modulation format applied to the transmitted optical signal, and it is an advantageous feature of the present invention that, in various embodiments thereof, improvements in the quality of signals received over non-linear optical channels may be achieved using a variety of arrangements, enabling various technical factors and cost considerations to be traded off against overall improvements in signal quality.

Further preferred features and advantages of the invention will be apparent to those skilled in the art from the following description of preferred embodiments of the invention, which should not be considered to be limiting of the scope of the invention as defined in the preceding statements, or in the claims appended hereto.

BRIEF DESCRIPTION OF THE DRAWINGS

Preferred embodiments of the invention are described with reference to the accompanying drawings, in which.

DETAILED DESCRIPTION OF PREFERRED EMBODIMENTS

Figure 1A:
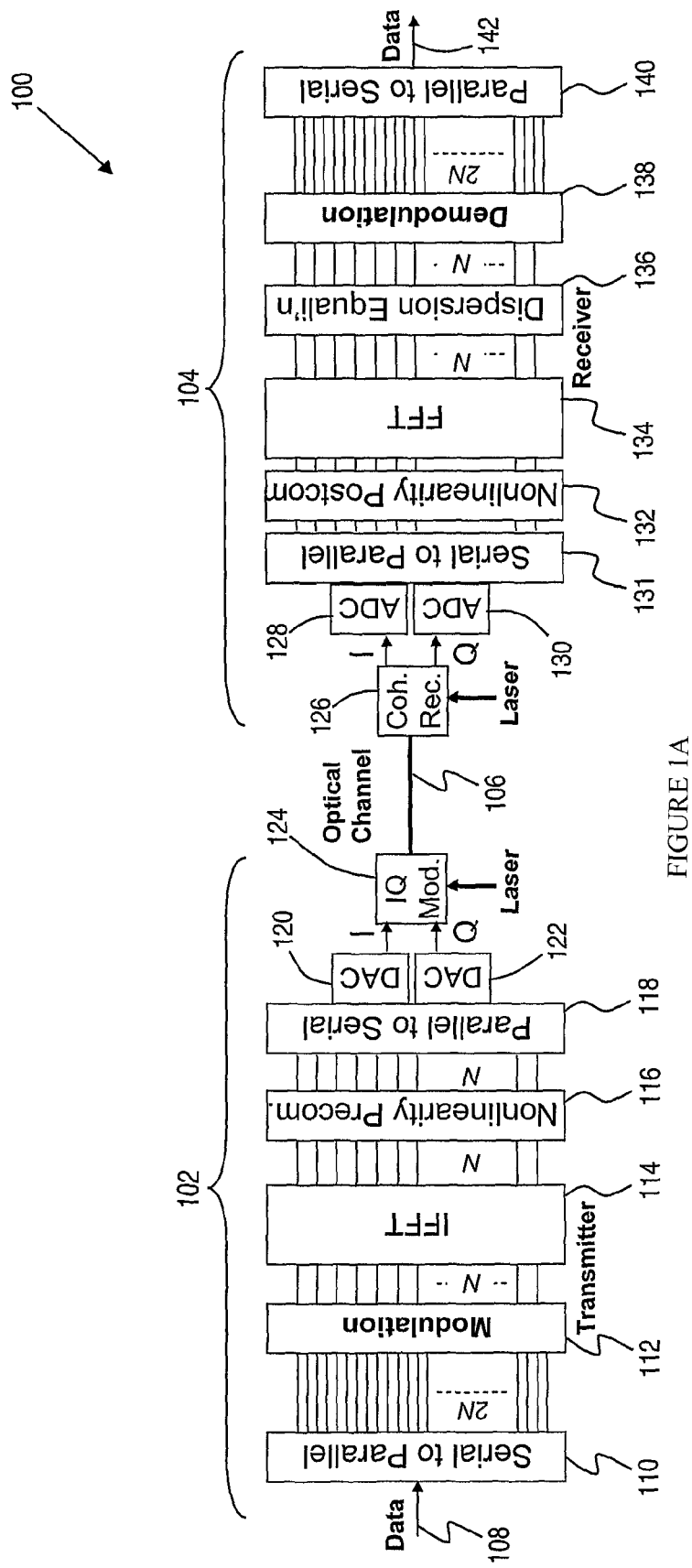
FIG. 1A illustrates schematically a system for communicating digital information over a non-linear optical channel according to an embodiment of the invention.

Turning first to FIG. 1, there is shown schematically a system 100 for communicating digital information over a non-linear optical channel according to a preferred embodiment of the present invention. While the invention is exemplified herein by the system 100, which employs orthogonal frequency division multiplexing (OFDM) in encoding and modulating digital signals for transmission over the optical channel, it is to be understood that the invention is not limited to this particular embodiment. Rather, embodiments of the invention are characterised generally by the generation of an information-bearing signal which includes a plurality of closely-spaced sub-carriers when represented in the frequency domain, the application of a time-varying phase modulation which is a function of a transmitted optical power characteristic corresponding with the information-bearing signal, and the application of the information-bearing signal and the time-varying phase modulation to an optical source in order to generate a corresponding transmitted optical signal having substantially the transmitted optical power characteristic utilised by the phase modulation function. The key to improving the received signal quality, in accordance with embodiments of the invention, is the selection of the function of transmitted optical power so as to mitigate the effect of the non-linearity of the optical channel upon the transmitted optical signal.

Similarly, while the system 100 generally includes non-linearity compensation via phase modulation at both the transmitting end (ie pre-compensation), and at the receiving end (ie post-compensation), the scope of the present invention encompasses pre-compensation and post-compensation alone, as well as various combinations of both, and recognises that in appropriate circumstances an optimum combination of pre- and post-compensation may be achieved.

The exemplary system 100 includes transmission apparatus 102 and receiving apparatus 104, which for convenience are more generally referred to herein as the "transmitter" and the "receiver" respectively.

The transmitter 102 communicates with the receiver 104 via optical channel 106, which generally exhibits both optical non-linearity and linear optical dispersion, such as chromatic dispersion and polarisation-mode dispersion. Although in FIG. 1 details of the optical channel 106 are not shown, it is envisaged that in typical implementation the optical channel 106 consists of a plurality of spans of single-mode optical fibre, with optical amplifiers, such as erbium-doped fibre amplifiers, disposed between pairs of spans in order to compensate for the attenuation of signals within the single-mode fibre.

At the transmitter 102, digital data is applied at input 108 in a serial format. The input digital data is simply a sequence of binary digits representing digital information for transmission via the optical channel 106, typically having a fixed data rate, for example 10 Gb/s. The input digital data is converted from serial to parallel form in serial-to-parallel converter 110, which has 2N outputs, where N is a characteristic block length utilised by the transmission system 100. A set of mapping units 112 encode the parallel input data bits to provide a corresponding block of encoded symbol values. The operation performed by the mapping units 110 effectively "modulates" one or more data bits onto each one of the outputs of the mapping units 112. In the embodiment 100, the mapping units 112 have 2N inputs and N outputs, wherein pairs of data bits are mapped onto corresponding 4-QAM complex symbol values. That is, each 4-QAM symbol value is a complex number representing the amplitude and phase modulation to be applied to a corresponding frequency carrier of the transmitted signal. It will be appreciated, however, that lower or higher order QAM mapping schemes may equally be employed, and that alternative mapping schemes may also be used for encoding of the input data, including, but not limited to OOK, ASK, PSK, FSK and so forth.

The transmitter 102 further includes a frequency-to-time transformation 114, a parallel-to-serial converter 118, dual digital-to-analog converters 120, 122, and an IQ optical modulator 124. The frequency-to-time transformation 114 is implemented using an Inverse Discrete Fourier Transform (IDFT), which may be readily provided using either digital electronic hardware or software means, or a combination of hardware and software, most conveniently utilising a Fast Fourier Transform (FFT) algorithm, as well known in the art.

Broadly speaking, the serial-to-parallel converter 110, the mapping units 112, the IDFT 114, the parallel-to-serial converter 118, and the digital-to-analog converters 120, 122 together form a signal generator which is arranged to generate an information-bearing signal which includes a plurality of closely-spaced sub-carriers when represented in the frequency domain, and the signal generator can more particularly be identified as implementing an OFDM modulation method. The outputs of the signal generator, ie the outputs of the dual digital-to-analog converters 120, 122, are time-varying waveforms representing the real and imaginary components (ie in-phase and quadrature) of the information-bearing signal respectively. These outputs are utilised to drive the IQ modulator 114, which according to the preferred embodiment 100 modulates an optical source, such as a laser generating an output optical carrier wave, to produce an optical signal having in-phase and quadrature components corresponding with the information-bearing outputs of the signal generator.

Also included in the transmitter 102 is a bank of non-linearity pre-compensation units 116. As will be appreciated, the inputs to the pre-compensation units 116, being the outputs of the frequency time transformation 114, consist of a sequence of complex signal values, represented in the time domain, albeit in parallel format. The non-linearity pre-compensation units 116 act as a modulation means for applying a phase modulation to the sequence of signal values. In accordance with the invention, the level of phase modulation applied to each signal value is generally time-varying, ie may be different for each individual signal value. In particular, the phase modulation applied to a particular signal value is a function of the anticipated transmitted optical power corresponding with said signal value. As will be appreciated, the transmitted optical power will determine the effect of non-linearity of the optical channel 106 upon the transmitted signal, and accordingly it is a purpose of the invention to provide for the selection of a phase modulation function which, when applied to the transmitted signal values by the non-linearity pre-compensation units 116, will mitigate the effect of non-linearity of the optical channel upon the transmitted optical signal, and thereby improve the quality of the corresponding signal received by the receiver 104. As will be appreciated, given known characteristics of the IQ modulator 114, the output power of the optical source modulated thereby, as well as the correspondence between the amplitude of the electrical signals output from digital-to-analog converters 120, 122 and the input digital signal values, the relationship between any given signal value and the corresponding transmitted optical power is completely determined. Accordingly, there is no practical difficulty in implementing the non-linearity pre-compensation units 116 for any desired function of transmitted optical power.

In accordance with embodiments of the present invention, closely-spaced sub-carriers, such as those generated using OFDM modulation methods, experience very little relative walk-off between adjacent channels due to dispersion during transmission in optical fibres, and other optical media. Previously, this may have been considered to be disadvantageous, since walk-off between adjacent channels, which have the greatest non-linear impact upon one another, is generally understood to assist in mitigating non-linear distortion. However, it is now being realised, in the context of the present invention, that if walk-off between adjacent channels can be wholly neglected, then it is possible, at least to first order, to approximate the optical channel 106 as being dispersionless for the purposes of calculation of the effects of channel non-linearity. Neglecting dispersion greatly simplifies the non-linear equalisation problem, because the usual split-step algorithm conventionally utilised for modelling dispersive non-linear channels reduces to a single step for the entire transmission span. This single step, again to first order, applies a phase modulation to the propagating signal which is proportional to the instantaneous optical power thereof. It is thus possible to approximate ideal non-linear compensation by the application of an equal and opposite (ie negative) phase shift to that expected in propagation through the non-linear optical channel 106. Accordingly, in at least preferred embodiments of the invention, the phase modulation applied by the non-linearity pre-compensation units 116 is simply a phase shift which is proportional to the transmitted optical power associated with the signal value to which the phase modulation is applied.

As will be appreciated, the phase modulation characteristic consisting of a phase shift proportional to optical power is simple and efficient to compute and apply, each step requiring only a single multiplication. By comparison with prior art electronic compensation techniques, which require detailed and computationally expensive modelling of complete dispersive and non-linear transmission links, embodiments of the present invention provide for a substantial simplification and improvement in computational efficiency. Indeed, while many prior art methods require extensive pre-calculation to enable compensation for non-linear propagation, embodiments of the present invention are readily implemented which are able to perform all required computations "on the fly". The cost of applying non-linearity compensation is comparable to that of applying dispersion equalisation, and significantly less computationally expensive than other operations performed by the system, such as the frequency/time transformation 114, all of which are nonetheless readily achievable with existing technology.

It will therefore be appreciated that while presently preferred embodiments use only a simple phase shift for non-linearity compensation, there remains considerable scope for more sophisticated phase modulation functions to be applied, while still maintaining relatively low computational complexity. For example, rather than the simple linear function of optical power described herein, high order polynomial functions, such as quadratic functions, could be utilised in order to correct for deficiencies of the first order approximation upon which the linear phase modulation method is based. Phase modulation functions could also include filter functions, to provide frequency-dependent pre-emphasis, for example, time delays, to allow for finite time constants within the non-linear transmission system, and so forth. It is to be understood that all such refinements and improvements are within the scope of the present invention.

As noted above, the transmitter 102 within the exemplary system 100 utilises an IQ modulator 124 to provide for independent in-phase and quadrature modulation of an optical source. Within the transmitter 102 the IQ modulator 124 is configured to produce an output optical signal which consists of a single optical sideband, wherein the optical carrier is substantially suppressed, ie the carrier is absent for all practical purposes. This signal requires the use of a coherent receiver, as described in greater detail below. However, the invention is not limited to this form of modulation, and it is to be understood that the important characteristic of the optical signal ultimately detected at the receiver 104 is that the in-phase and quadrature phase information should be preserved into the electrical domain after detection. This may be achieved using single sideband modulation with or without an optical carrier, or with a suppressed carrier, with a local optical oscillator required at the receiver in cases where no carrier is transmitted. A single sideband signal may be generated using an IQ modulator, as in the present embodiment, or using other forms of multi-electrode modulator, or simply by utilising a conventional intensity modulator, in combination with suitable optical filtering. The implementation and operation of such modulation methods will be readily available to those skilled in the art of optical communications, and further detail of the effects of choosing different forms of modulation on the operation of embodiments of the present invention are discussed below with reference to FIGS. 7 and 8.

The receiver 104 of the exemplary system 100 includes a coherent detector 126, typically including a photodetector such as a PIN photodiode, in combination with a local optical oscillator, such as a laser source similar to that provided at the transmitter, for detection and demodulation of the received optical signal to a predetermined frequency range within the electrical domain. The detection apparatus 126 may include appropriate RF components, such as oscillators and mixers, for extracting the in-phase and quadrature components of the detected signal. Alternatively, extraction of the in-phase and quadrature components may be performed within detection apparatus 126 in the optical domain, by utilising suitable optical devices (such as integrated waveguide splitters and combiners) for combining the received signal with corresponding in-phase and quadrature components of the local optical oscillator at respective first and second photodetectors to generate corresponding in-phase and quadrature RF components.

The orthogonal time-varying signal components are input to analog-to-digital converters 128, 130 to produce a corresponding sequence of sampled signal values in the time domain. Serial-to-parallel converter 131 converts the serial sequence of time samples into a corresponding parallel sequence of complex values. Following serial-to-parallel conversion, there is optionally included in the receiver 104 a bank of non-linearity post-compensation units 132, the function of which is described in greater detail below. A time-to-frequency transformation 134, being the inverse of the frequency-to-time transformation 114, generates a corresponding set of received symbol values in the frequency domain. The block of received symbol values is input to dispersion equalisation units 136, which apply an appropriate phase shift to each symbol value in order to compensate for frequency-dependent dispersion of the optical channel 106. The operation of the dispersion equalisation method and apparatus are disclosed in earlier international application no. PCT/AU2006/001511. Demapping units 138 reverse the mapping function of the mapping units 112 (ie the 4-QAM mapping in the preferred embodiment 100) to produce a corresponding parallel sequence of digital information bits. Parallel-to-serial converter 140 converts the bits back into serial format at output 142.

Under ideal, error-free, operation of the system 100, the bits appearing at output 142 of the receiver 104 are identical with the bits applied to input 108 of transmitter 102. As will be appreciated, even with compensation for non-linearity and dispersion of the optical channel 106, in any practical implementation errors in transmission of information may still occur. For example, noise processes within the electrical and optical transmission paths may result ultimately in errors in the decision-making process implemented by the demapping units 138. Additionally, the non-linearity compensation and/or the dispersion compensation may be imperfect. While not shown in FIG. 1, it will be understood that in a practical implementation techniques such as forward error correction (FEC) may be applied in order to mitigate or entirely eliminate errors in data transmission. Accordingly, the transmission system exemplified by the system 100 need not be perfect, so long as an acceptable error rate is achieved which is sufficiently low to enable FEC methods to recover the original information. Such techniques are well known in the art of digital communications, and therefore will not be discussed in greater detail herein.

The non-linearity post-compensation units 132 operate in a similar manner to the non-linearity pre-compensation units 116. Once again, the objective is to mitigate the effects of non-linear propagation within the optical channel 106 by applying an appropriate phase modulation to the received signal sample values. The applied phase modulation is generally a function of the optical power transmitted into each span of the transmission channel 106, which may readily be inferred from the corresponding signal amplitude, once again given assumed knowledge (available in any practical system) of the characteristics of the transmitter 102. A phase shift proportional to the received optical power (which in turn is presumed proportional to the transmitted optical power) may be applied based upon a first order approximation of dispersionless transmission. As for pre-compensation in the transmitter 102, more sophisticated functions of the received optical power may be utilised to determine the applied phase modulation, if desired.

The transmitter 102 and receiver 104 having the forms shown in the system 100 represent a particularly convenient and preferred implementation of the present invention. Specifically, the majority of signal processing is performed in the electrical domain, and more particularly in the digital domain. Accordingly, the vast majority of required functionality may be provided using either general purpose digital signal processing hardware programmed with suitable software, and/or with special purpose digital components for performing specific operations (such as the frequency/time and time/frequency transformations). It will be appreciated however, that the embodiment 100 is not the only implementation possible, and numerous variations will be apparent to persons skilled in the relevant arts. In particular, it will be appreciated that the phase modulation is applied to the information-bearing signal, and that this is effectively done in the time domain. Accordingly, the phase modulation could equally be applied directly to the optical signal after the information-bearing signal has been modulated onto an optical carrier, eg using an optical phase modulator disposed after the IQ modulator 124. As another example, the requisite phase modulation could be applied simultaneously with the information-bearing signal, by combining the signals output from the digital-to-analog converters 120, 122 with appropriate phase modulation signals input to the IQ modulator 124. These alternatives are intended to be exemplary, and it will be appreciated that further variations are also possible.

Figure 1B:
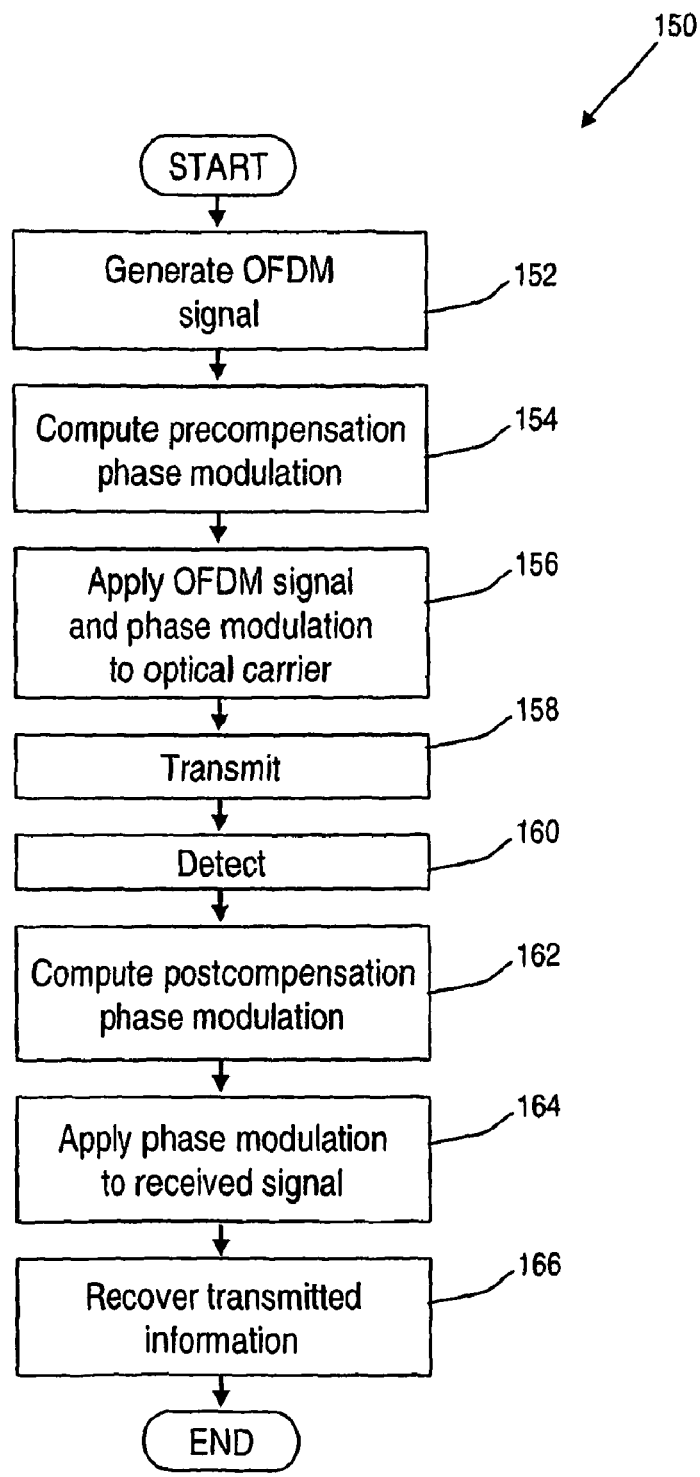
FIG. 1B is a flowchart illustrating a method of transmitting information over a non-linear optical channel implement by the system of FIG. 1A.

A general method of transmitting information over a non-linear optical channel, in accordance with an embodiment of the invention and as implemented by the system 100, is illustrated in the flowchart 150 in FIG. 1B. At step 152 an information-bearing signal, being preferably an OFDM signal, is generated which includes a plurality of closely-spaced subcarriers in the frequency domain. At step 154 a time-varying phase modulation is computed (ie a pre-compensation phase modulation) which is a first function, preferably being a linear function, of the transmitted optical power characteristic corresponding with the information-bearing signal. At step 156 the OFDM signal and computed pre-compensation phase modulation characteristic are applied to the optical carrier, to generate a corresponding transmitted optical signal which is sent via a non-linear optical channel, such as an optical fibre, at step 158.

At step 160 the optical signal received from the non-linear channel is detected. At step 162, a time-varying phase modulation characteristic is computed which is a second function of the optical power characteristic corresponding with the received optical signal. This further time-varying phase modulation characteristic, also known as a post-compensation phase modulation, is again preferably a linear function of the received optical power. At step 164, the post-compensation phase modulation is applied to the received signal. The transmitted information is recovered from the resulting signal at step 166.

While the general method illustrated in the flowchart 150 includes both pre-compensation and post-compensation of transmitted optical signals, it will be understood that in various embodiments of the present invention either pre-compensation, post-compensation, or both pre- and post-compensation may be performed. Accordingly, in some embodiments either the pre-compensation step 154 or the post-compensation steps 162, 164 may be omitted.

A number of computer simulations have been conducted in order to assess the effectiveness of the exemplary system 100. These simulations have been applied to model systems consisting of a plurality of optical fibre transmission spans, each of which is assumed, for simplicity, to be identical, wherein optical amplifiers are disposed between adjacent spans to compensate for the loss of the preceding span. The instantaneous time-varying optical power at the input to each span is designated P(t), while each span is characterised by a non-linear parameter $\gamma$ which depends upon its non-linear coefficient, effective cross-sectional area, and an operating wavelength, as well as a further parameter $L_{\mathit{eff}}$ which is an effective non-linear length of the span. The total number of fibre spans is designated by the symbol S. Accordingly, to a first approximation the magnitude of the phase shift to be applied in order to compensate for non-linear propagation within the optical channel 106 is given by $\gamma P(t) L_{\mathit{eff}} S$.

In principle it is possible to determine the values of the constant $\gamma$ and the effective length $L_{\mathit{eff}}$ from measured properties of the fibre spans, however in practice this may be difficult and/or computationally inefficient. A particular advantage of the present invention, in at least preferred embodiments, is that an exact predetermination of these parameters is not necessary. It will suffice, instead, to make a reasonable estimate of the parameter $\gamma$ based upon generally known properties of the optical fibre spans, and then to use the effective length $L_{\mathit{eff}}$ as a "free parameter", which may be varied in any given system in order to optimise the quality of the received signal. Since the non-linear properties of the optical channel 106 are generally not time-varying, and certainly not rapidly time-varying, a single optimisation when the transmission link is established and/or relatively infrequent periodic optimisations are sufficient to maintain near-optimum received signal quality. The simulation results described in greater detail below illustrate the potential stability of such an optimisation process.

FIGS. 2A, 2B, 3A, 3B, 4A, 4B and 4C relate to computer simulations of a system 100 wherein only pre-compensation for optical non-linearities is applied in the transmitter 102. No compensation for non-linearity is included within the receiver 104. However, complete compensation for dispersion is provided in the receiver 104. The simulated data rate is 10 Gb per second, with a block length of 124 bits, giving 512 OFDM carriers in an optical bandwidth of 5 GHz with 4-QAM. The optical channel 106 includes 50 uncompensated fibre spans of 80 km in length each, providing a total transmission distance of 4,000 km. Fibre loss is 0.2 dB/km. Optical amplifiers between each fibre span compensate for the 16 dB fibre loss, and in order to demonstrate more clearly the effectiveness of the present invention ideal noiseless amplifiers were assumed. The amplifiers were also assumed to be operating in a output power-controlled mode, in order to ensure the same input power to each 80 km fibre span.

Figure 2A:
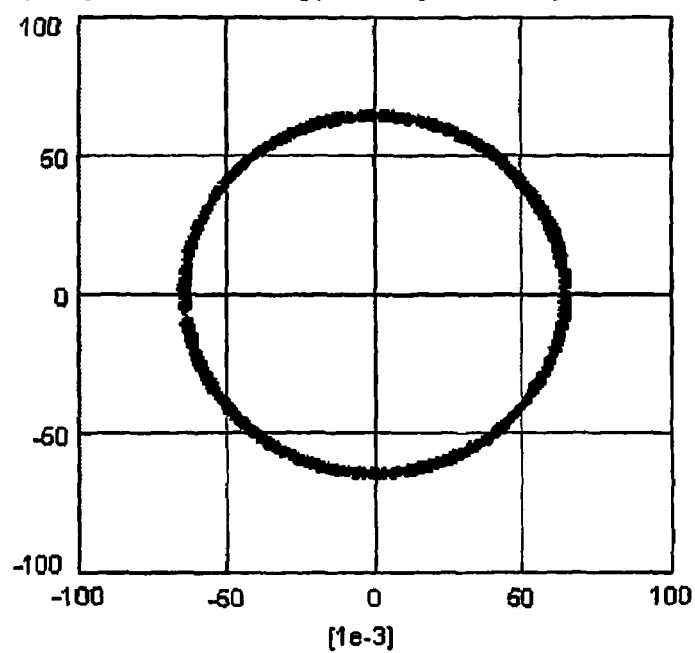
FIGS. 2A and 2B show example constellation patterns corresponding with linear transmission, with and without dispersion compensation.
Figure 2B:
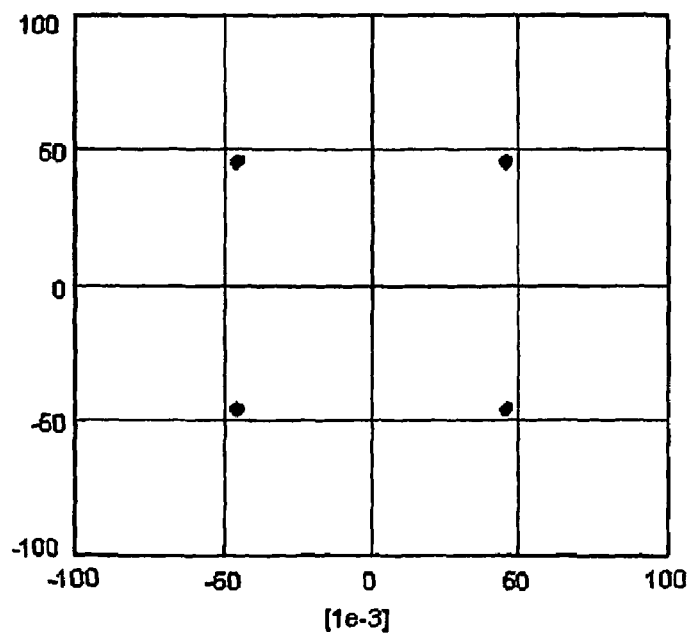

FIGS. 2A and 2B show example constellation patterns corresponding with noiseless linear transmission (ie with amplifier noise and the non-linearities of the optical fibre disabled in the simulation). FIG. 2A shows the received 4-QAM constellation without dispersion compensation, in which the QAM symbols have been "smeared" into a circle resulting from the conversion of fibre dispersion directly into an electrical phase error. Application of an appropriate phase compensation characteristic within the dispersion equalisation units 136 produces the constellation pattern shown in FIG. 2B, which illustrates the ability of the dispersion equalisation to provide perfect recovery of the transmitted QAM constellation.

Figure 3A:
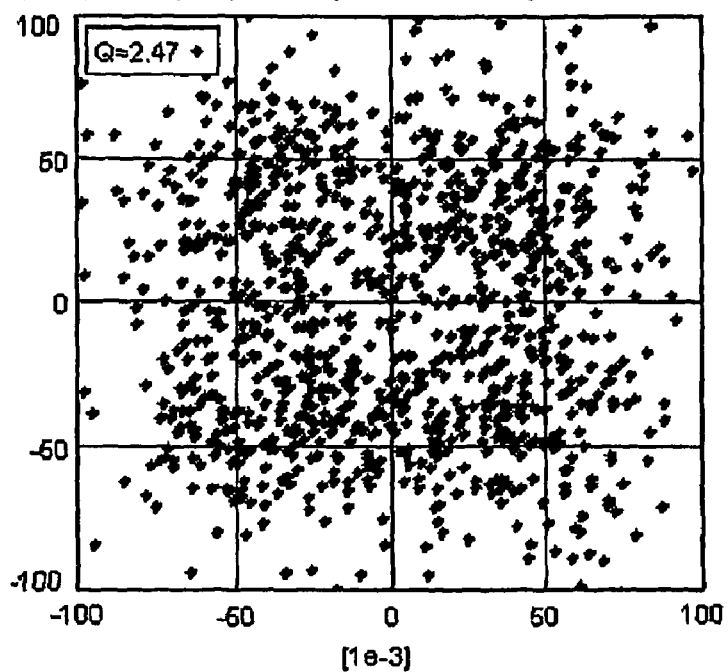
FIGS. 3A and 3B show example constellation patterns corresponding with non-linear transmission, with and without non-linear pre-compensation in accordance with an embodiment of the invention.
Figure 3B:
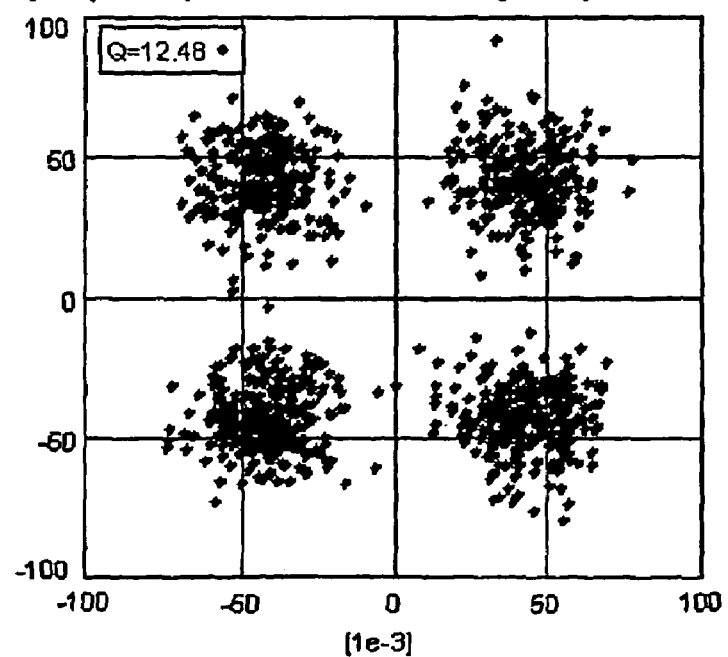

FIGS. 3A and 3B show example constellation patterns corresponding with non-linear transmission (ie with full simulation of all non-linear processes within the optical fibre spans). In FIG. 3A, the received QAM constellation in the absence of non-linearity pre-compensation in the transmitter 102 is shown. The symbols at each point of the constellation are spread into adjacent symbol regions due to non-linear transmission distortion. It is plainly apparent that reliable recovery of the transmitted signal would not be feasible in this case. The received electrical signal quality, Q, defined as the square of the mean distance of the symbols from a relevant axis divided by the corresponding variance, is 2.47. In FIG. 3B the constellation pattern corresponding with the same system, with non-linearity pre-compensation enabled, is shown. In this case, the symbols at each QAM constellation point are clearly clustered and distinguishable. The compensation has been applied using a phase shift calculated for an effective length per span of 12 km, which was found to maximise Q for the particular input power and dispersion utilised in the simulation. In this case, Q is 12.48, which is sufficient to achieve a low bit error rate when combined with FEC.

Figure 4A:
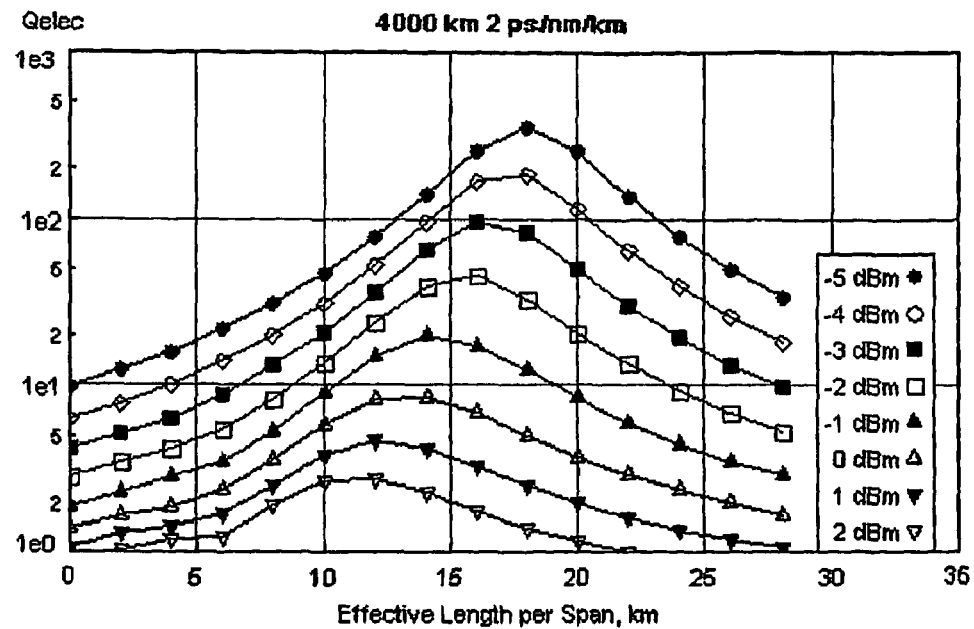
FIGS. 4A, 4B and 4C are graphs illustrating received signal quality as a function of pre-compensation effective length parameter, according to an embodiment of the invention.
Figure 4B:
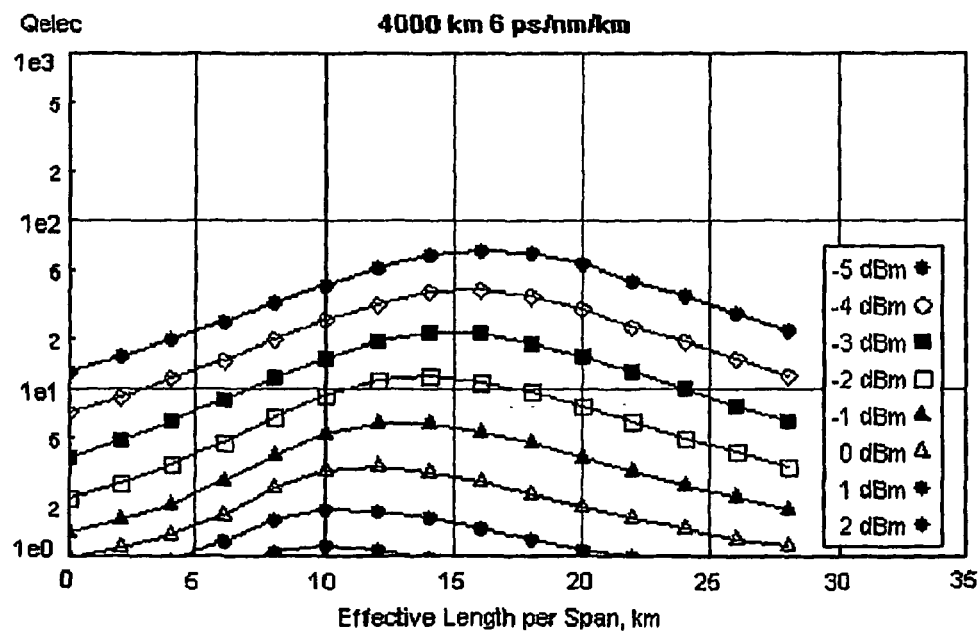
Figure 4C:
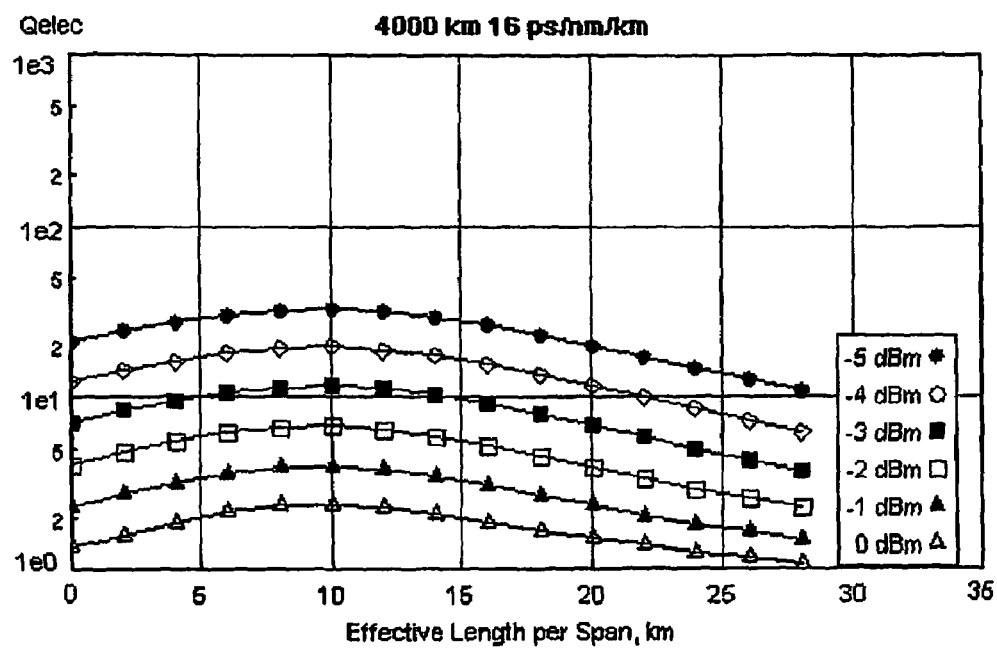

FIGS. 4A, 4B and 4C are graphs illustrating received signal quality as a function of the pre-compensation effective length parameter. The results in FIG. 4A correspond with the transmission fibre having chromatic dispersion of 2 ps/nm/km. The results in FIG. 4B are for fibre having dispersion of 6 ps/nm/km, while the results in FIG. 4C for fibre having dispersion of 16 ps/nm/km (roughly equivalent to standard single-mode fibre). The different curves in each graph correspond with different input powers, in accordance with the respective legend included in each graph. The x-axis in each case is the effective length per span, in kilometers, while the y-axis is the received electrical signal quality Q.

As might be expected, in each case superior received signal quality is achieved for lower input optical powers, for which the general effect of optical non-linearity is least significant. However, in all cases, substantial improvements in received signal quality are achievable by the application of non-linear pre-compensation. It is noteworthy that the optimum value of the effective length parameter tends to be lower for higher launched optical powers, which presumably reflects the fact that the strongest non-linear interactions occur in the input portions of the fibre spans, where the total optical power is greatest. In all cases, the curves have relatively smooth peaks, indicating that near-optimum received signal quality is achievable over a relatively broad range of values of the effective length parameter, such that precise determination and maintenance of this parameter is not critical.

Turning now to FIGS. 5A, 5B, 5C and 6, there are shown results corresponding with a second group of simulations, in which the receiver 104 incorporates non-linearity post compensation units 132. The parameters of these further simulations were identical with the simulations described above, with the exception that the optical channel 106 now consists of only 25 80-km spans, for a total of 2,000 km. For the results shown in FIGS. 5A, 5B and 5C, the fibre dispersion is 6 ps/nm/km, and the input power to each fibre span is −1 dBm. For the results shown in FIG. 6, the fibre dispersion is 16 ps/nm/km and the input power to each fibre span is −2 dBm.

Figure 5A:
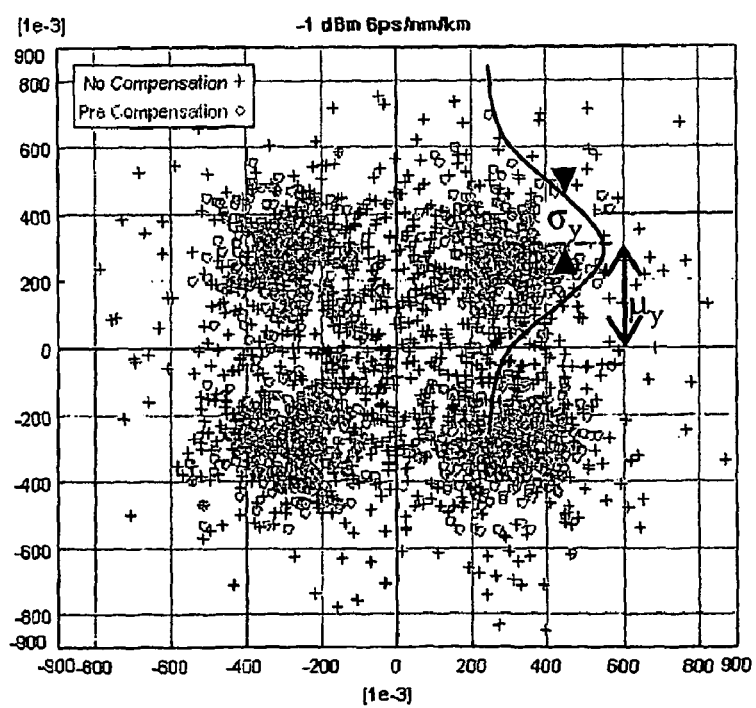
FIGS. 5A, 5B and 5C show example constellation patterns corresponding with non-linear transmission, with and without different combinations of non-linearity pre-compensation and post-compensation in accordance with embodiments of the invention.
Figure 5B:
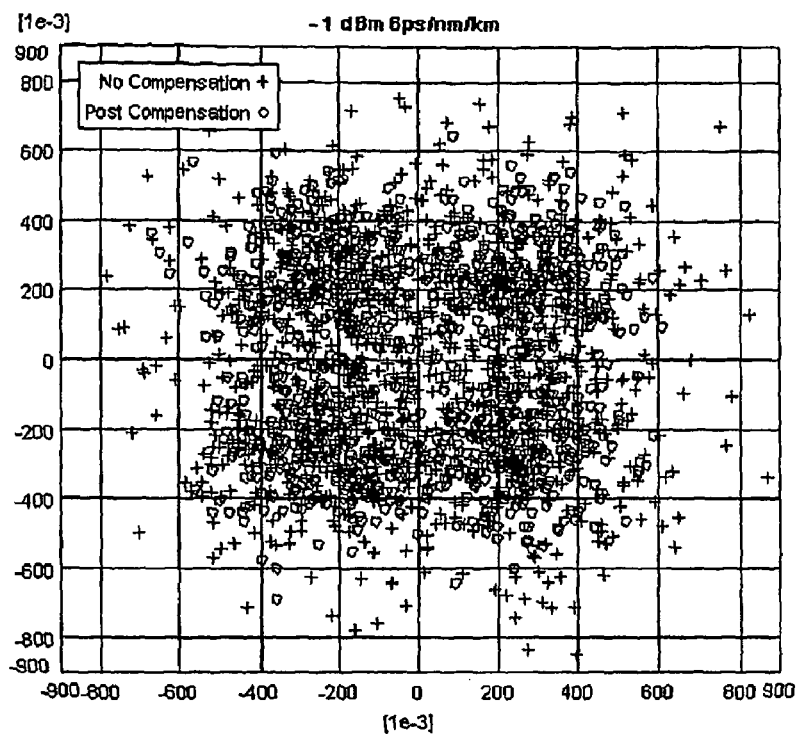
Figure 5C:
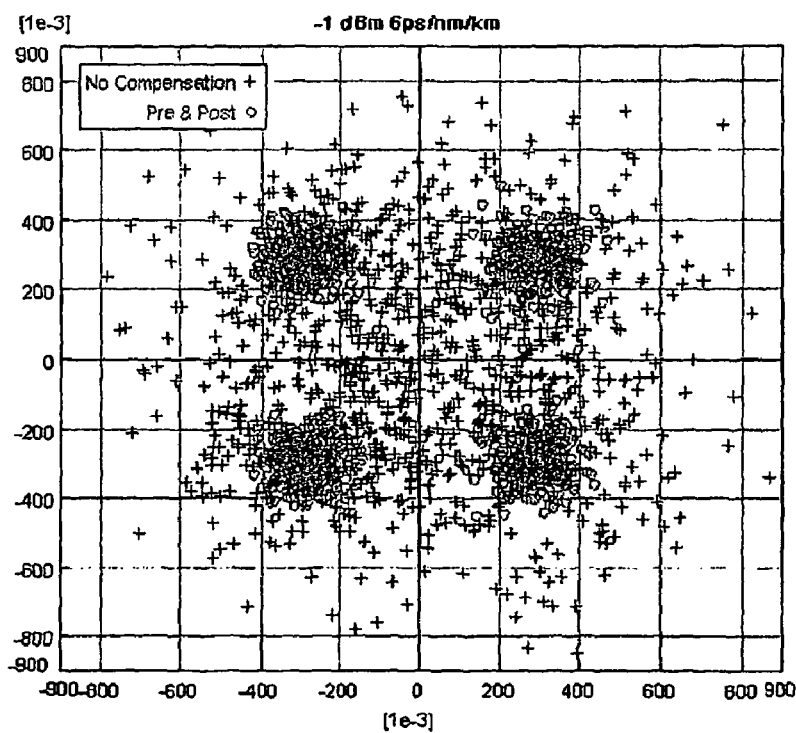

FIGS. 5A, 5B and 5C show example constellation patterns corresponding with non-linear transmission with and without different combinations of non-linearity pre- and post-compensation. In particular, FIG. 5A shows a comparison between no compensation (crosses) and pre-compensation only (circles). It is clear that the scattering of the points of the constellation is significantly reduced by the application of pre-compensation, and in fact the value of Q improves from 1.9 dB to 8.7 dB when pre-compensation is applied.

FIG. 5B shows a comparison of the constellations obtained when no compensation is applied, and when only post-compensation is applied in the receiver 104. Again, the symbol values with no compensation are represented by crosses, while the compensated symbol values are represented by circles. Post-compensation alone results in an increase in the value of Q from 1.9 dB to 6.4 dB. It is thus apparent that pre-compensation alone is superior to post-compensation alone.

FIG. 5C shows the corresponding uncompensated (crosses) and compensated (circles) constellations when both pre- and post-compensation are applied. In this case, the Q value has improved from 1.9 dB to 14.4 dB, and it is therefore apparent that an optimum combination of pre- and post-compensation is superior to either pre-compensation or post-compensation alone.

Figure 6:
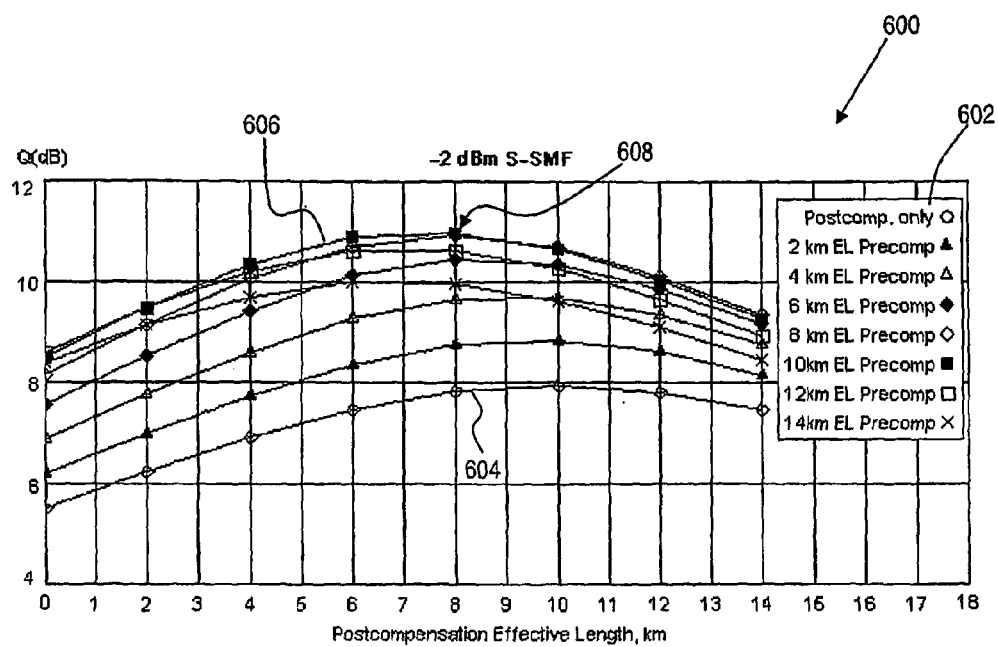
FIG. 6 is a graph illustrating received signal quality as a function of pre-compensation and post-compensation effective length parameter, according to embodiments of the invention.

FIG. 6 shows a series of graphs illustrating the received signal quality (Q) as a function of both the pre-compensation and post-compensation effective length parameters, for standard single-mode fibre having dispersion of 16 ps/nm/km and with an input power to each span of −2 dBm. Each curve in FIG. 6 represents a particular level of pre-compensation, corresponding with a specific pre-compensation effective length parameter, as indicated in the legend 602. The x-axis of the graph is the post-compensation effective length parameter, while the y-axis is the received Q value, expressed in dB. The lowest curve 604 is for post-compensation only, while the uppermost curve 606, which generally provides the best overall signal quality, corresponds with a pre-compensation effective length parameter of 10 km. The optimum combination of pre- and post-compensation illustrated in the graphs of FIG. 6 occurs for pre-compensation of 10 km, and post-compensation of 8 km (point 608). However, it will be appreciated that the graph shows effective length parameters using 2 km increments, and a more detailed optimisation finds that the best performance is achieved when both the pre- and post-compensation effective length parameters are set to 8.5 km. In this case, the corresponding Q value is 10.9 dB, which is not a significant improvement over the approximate optimum values illustrated in FIG. 6. Once again, the simulation results demonstrate that precise optimisation of the effective length parameters is not essential or critical in order to achieve the majority of the benefit available from the use of non-linearity compensation in accordance with the present invention.

The results relating to pre- and post-compensation discussed above relate to the exemplary system 100 illustrated in FIG. 1. As previously noted, this exemplary system uses an IQ modulator to generate a single sideband transmitted signal with no optical carrier, and further utilises coherent detection at the receiver. In this case, the simulation results demonstrate that optimum performance is achieved using approximately equal quantities of pre- and post-compensation. However, it should not be assumed that this result will apply in systems utilising alternative optical modulation formats. Further simulations conducted by the inventors indicate that, for example, transmitted optical signals including a single optical sideband and an optical carrier component, which enable simplified optical detection at the receiver, exhibit different optimal compensation configurations. In such embodiments, different results may be achieved depending upon whether or not the power in the optical carrier is included within the calculation of the phase modulation function, and whether or not the carrier itself is phase modulated (ie in the optical domain) along with the closely-spaced sub-carriers, or if only the sub-carriers are phase modulated (eg in the electrical domain). Simulations performed to date suggest that in at least some of these embodiments pre-compensation alone is superior to post-compensation alone, and also to any combination of pre- and post-compensation. It is therefore important to appreciate that all such embodiments lie within the scope of the present invention, and that the principles and techniques described herein may be utilised, for any given embodiment, to arrive at an optimum level of pre-compensation, post-compensation and/or combination of both pre- and post-compensation.

Furthermore, it may be advantageous to perform additional processing and/or filtering of signals in those embodiments of the invention employing various alternative modulation formats. In particular, a significant benefit of transmitting a signal including a transmitted optical carrier component is that a coherent receiver (ie a receiver incorporating a local optical oscillator, such as a laser) is not then required, and a more simple direct detection type of receiver may be employed. However, as will now be explained with reference to FIG. 7, the inclusion of an optical carrier in the transmitted signal may result in the generation of undesired distortion components, the impact of which may be mitigated by utilising additional processing and/or filtering steps and components.

Figure 7:
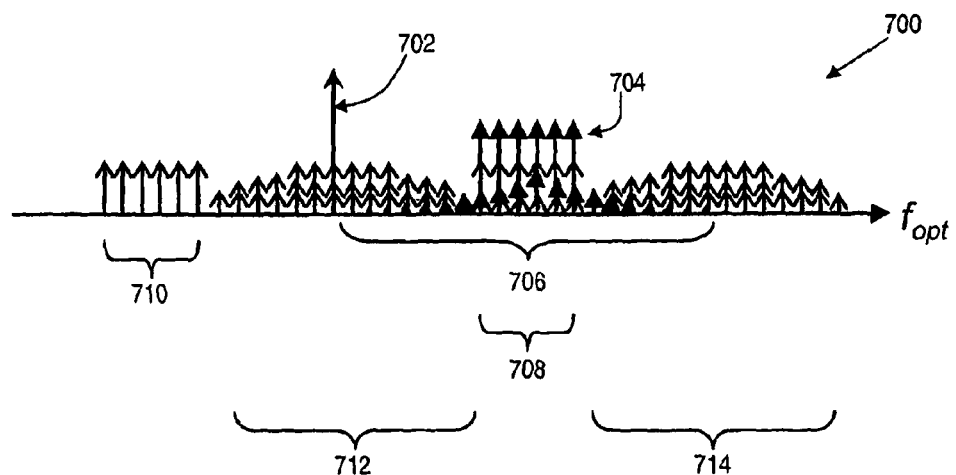
FIG. 7 is a schematic illustration of a transmitted optical signal spectrum according to an embodiment of the invention.
Figure 8:
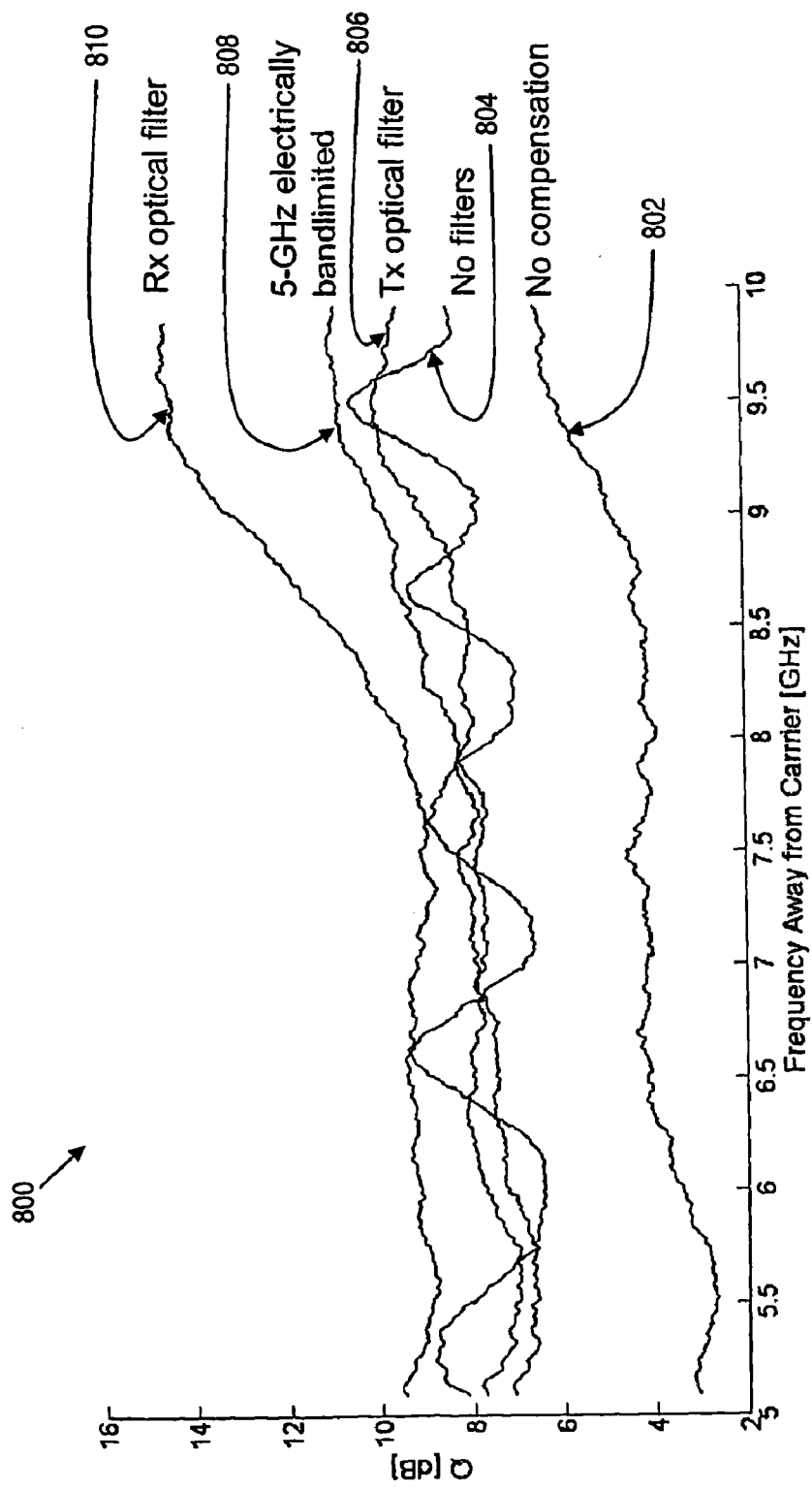
FIG. 8 is a graph of simulation results illustrating a comparison between performance of a number of alternative embodiments of the invention.

FIG. 7 is a schematic illustration of a transmitted optical signal spectrum 700 corresponding with a signal having an optical carrier 702, and a single sideband 704 of closely-spaced sub-carriers. The application of phase modulation to such a signal, and/or the transmission of the signal via a non-linear channel such as an optical fibre, may result in the generation of various distortion components.

In particular, five groups of distortion components, 706, 708, 710, 712, 714, are illustrated in the spectrum 700 of FIG. 7. The first distortion components 706 result from non-linear mixing between the sub-carriers 704. These components may be generated during the process of phase modulation at the transmitter (ie pre-compensation), in which case they are, ideally, substantially nullified in the course of transmission through the non-linear optical channel. Distortion components 706 are the only components present in the absence of an optical carrier 702.

Distortion components 708 (distinguishable from the sub-carriers 704 and distortion components 706 by the use of open arrowheads in the spectrum 700) result from non-linear mixing between the carrier 702 and the sub-carriers 704. Since the distortion components 708 coincide with the sub-carriers 704 it may initially appear desirable to include the carrier, and hence the distortion component 708, in pre-compensation and/or post-compensation calculations. In this case, it would theoretically be possible to mitigate the impact of the distortion components 708 on the desired information-bearing sub-carriers 704. However, non-linear mixing between the carrier 702 and sub-carriers 704 also generates the distortion components 710, which are the "image" of distortion components 708 in the alternative sideband. If present in the detected signal, the image components 710 also mix with the carrier 702 to generate interference with the received sub-carriers 704 in the electrical domain. However, due to dispersion within the transmission fibre, a frequency-dependent phase shift will exist between each distortion component of the group 708 and its image within the group 710. As a result, there will be a frequency dependent "fading" of the corresponding non-linear interference components, which will not be correctly compensated. Accordingly, the combination of non-linear propagation and dispersion renders the transmission and/or reception of distortion components 710 undesirable.

Distortion components 712, 714, are secondary non-linear mixing products resulting from mixing between the sub-carriers 704, and the primary distortion components 708, 710 generated by non-linear mixing between the carrier 702 and sub-carriers 704. It is accordingly apparent that the overall bandwidth of the power spectrum 700 is dependent upon whether or not there is a carrier 702 present in the transmitted signal. In particular, the overall bandwidth of the transmitted signal is substantially greater if a carrier 702 is present, since in the absence of the carrier 702 the only components present are the sub-carriers 704, and distortion components 706.

As noted above, it is the presence of the distortion "image" components 710 that is considered to be particularly undesirable, due to interactions between non-linear propagation and dispersion. Accordingly, it is preferable, in some embodiments of the invention, to avoid the generation and/or transmission of distortion components 710, in order to maximise overall system performance. This is illustrated by the graph 800, shown in FIG. 8, which includes simulation results comparing the performance of a number of alternative embodiments of the invention in which an optical carrier 702 is transmitted along with the information-bearing sub-carriers 704.

The graph 800 depicts the signal quality for each sub-carrier, in a system employing sub-carriers over a range of 5 to 10 GHz from a corresponding optical carrier, as a function of relative sub-carrier frequency. The horizontal axis of the graph 800 is sub-carrier frequency relative to the optical carrier, in gigahertz. The vertical axis is signal quality, Q, measured in dB. The trace 802 represents the performance of the system in the absence of any compensation for non-linear propagation effects. The trace 804 represents the performance of the system when pre-compensation is performed, but no steps are taken to eliminate the undesired image distortion components 710. As can be seen, the frequency-dependent phase shift, caused by dispersion in the transmission fibre, results in a "ripple" in the signal quality across the range of sub-carriers. In particular, sub-carriers having frequencies corresponding with the "troughs" in the ripple exhibit particularly degraded performance as a result of fibre dispersion.

In various presently contemplated embodiments, different techniques may be employed to mitigate the impact of fibre dispersion upon the performance of a system including pre-compensation in accordance with the present invention. In accordance with one arrangement, an optical filter is employed at the transmitter in order to substantially eliminate the image components 710 associated with the unused optical sideband. Corresponding results of employing this approach are represented by the trace 806, in which the ripple apparent in the trace 804 is substantially absent. However, it will be noted that while the trace 806 shows improved performance, compared to the trace 804, for the worst affected sub-carriers, a degradation in performance is also apparent for those sub-carriers that were not adversely affected by dispersion, ie those corresponding with the "peaks" of the ripple of trace 804. The reason for this is that optically removing the image component 710 at the transmitter necessarily also eliminates the possibility of successfully compensating, via pre-compensation, for the effects of non-linear interaction during transmission between the carrier 702 and sub-carriers 704 represented by those image components. It will be appreciated, however, as noted previously, that post-compensation may result in some additional improvement in this regard.

It has been noted that optical filtering limits the ability to compensate for non-linear interactions between the carrier 702 and the sub-carriers 704. A further alternative approach is accordingly to make no attempt, in computing the pre-compensation signal, to include interactions between the carrier and sub-carriers. This may be achieved either by excluding the optical carrier from the optical power characteristic corresponding with the information-bearing signal used to compute the time-varying (pre-compensation) phase modulation, or alternatively by band-limiting the phase modulation waveform to a total bandwidth equivalent to the sub-carrier frequency band. Band-limiting of the phase modulation waveform may be achieved, for example, by application of a suitable digital or analog filter. The result of utilising either of these approaches is illustrated by the trace 808 in graph 800. As can be seen, the performance in this case is similar to that achieved by utilising an optical filter at the transmitter (trace 806), but with the advantage of being substantially simpler to implement, particularly if performed in the digital domain.

Finally, the graph 800 further illustrates, in trace 810, the performance achieved by using an optical filter at the receiver. Of the embodiments compared in the graph 800, this approach has the best performance, which is because in this arrangement the greatest benefit is achieved from the application of pre-compensation, which accounts for non-linear interactions between the carrier and sub-carriers, prior to propagation of the carrier and sub-carriers through the non-linear optical channel.

In summary, the results in the graph 800 illustrate that, for a direct detection system employing pre-compensation only, best results are achieved by including an optical fitter at the receiver, in order to eliminate the received image distortion components 710. A potential disadvantage of such an approach is that the corresponding optical filter requires a very sharp cut-off, located precisely between the carrier 702 and the unwanted image components 710, and this may be difficult and/or expensive to achieve in practice. In many cases, therefore, it is envisaged that the use of electrical band-limiting at the transmitting end may be more practical and advantageous, due to relative ease of implementation. Additionally, the use of band-limiting at the transmitting end reduces the required bandwidth of the digital-to-analog converters, and other electrical components.

It will also be readily apparent to those skilled in the art that many variations of the present invention are possible, and that the invention is not to be limited to the particular embodiments described herein. Rather, the scope of the invention is defined by the claims appended hereto.

The invention claimed is:

1. A method of transmitting information over a non-linear optical channel, comprising the steps of:
   receiving a digital data input sequence;
   generating an electrical information signal comprising a plurality of closely-spaced sub-carriers in a frequency domain, and which encodes the digital data input sequence;
   generating a phase modulation which is a first function of an instantaneous value of a transmitted optical power characteristic corresponding with said electrical information signal, the first function being selected such that the effect of nonlinearity of the optical channel is mitigated;
   modulating an optical source with the electrical information signal to generate a corresponding optical information signal; and
   further modulating the optical source with the phase modulation to generate a pre-compensated transmitted optical signal.

2. The method of claim 1 wherein the step of generating the electrical information signal comprises:
   mapping the digital data input sequence to a series of symbol values, each of which corresponds with one or more bits of digital data modulated onto one of said plurality of sub-carriers; and
   applying a frequency/time transformation to generate a corresponding time sequence of signal values.

3. The method of claim 2 wherein the step of generating the electrical information signal is performed in accordance with an orthogonal frequency division multiplexing (OFDM) method.

4. The method of claim 1 further comprising the steps of:
   detecting the transmitted optical signal after propagation over the non-linear optical channel to produce a corresponding received time-varying electrical signal;
   determining a further phase modulation which is a second function of an instantaneous value of an optical power characteristic corresponding with said received electrical signal;
   applying said further phase modulation to said received electrical signal to produce a phase-modulated received signal; and
   recovering the transmitted information from the phase-modulated received signal,
   wherein said second function is selected such that the further phase modulation further mitigates the effect of the non-linearity of the optical channel on the transmitted optical signal.

5. The method of claim 4 wherein the steps of modulating the optical source are performed so as to generate a transmitted optical signal comprising at least an optical sideband and an optical carrier component, and wherein the step of detecting comprises optically filtering the optical signal to suppress components associated with an undesired optical sideband thereof.

6. The method of claim 4 further comprising the step of optimizing parameters of the first and second functions in order to provide improved overall non-linear compensation, as compared with compensation by the first function or second function alone.

7. The method of claim 1 wherein the first function of said optical power characteristic is a linear function, whereby the phase modulation comprises a phase shift which is proportional to instantaneous transmitted optical power.

8. The method of claim 1 further comprising a step of limiting a bandwidth of the phase modulation applied to the optical source.

9. The method of claim 8 wherein the step of limiting the bandwidth of the phase modulation comprises applying an analog or digital filter.

10. The method of claim 8 wherein limiting the bandwidth of the phase modulation comprises excluding a contribution of optical carrier power from the optical power characteristic employed in the step of generating the phase modulation.

11. A transmitter for use in transmitting information over a non-linear optical channel, the transmitter comprising:
a digital data input port;
a signal generator, adapted to generate an electrical information signal comprising a plurality of closely-spaced sub-carriers in a frequency domain, and which encodes a digital data sequence received at the digital data input port;
means for generating a phase modulation which is a function of an instantaneous value of a transmitted optical power characteristic corresponding with said electrical information signal, the function being selected such that the effect of nonlinearity of the optical channel is mitigated;
an optical source for generating an optical carrier wave;
a first optical modulator arranged to apply the electrical information signal to said optical carrier wave; and
a second optical modulator arranged to apply the phase modulation to said optical carrier wave to generate a pre-compensated transmitted optical signal.

12. The transmitter of claim 11 wherein the means for generating a phase modulation is adapted to compute a phase shift which is proportional to instantaneous transmitted optical power.

13. The transmitter of claim 11 wherein the means for generating a phase modulation is adapted to limit a bandwidth of the phase modulation.

14. A receiver for use in receiving information that has been transmitted over a non-linear optical channel, the receiver comprising:
an optical detector arranged to detect a received optical signal comprising said information transmitted over the non-linear optical channel, to produce a corresponding received time-varying electrical signal comprising a plurality of closely-spaced sub-carriers in a frequency domain;
means for determining a phase modulation which is a function of an instantaneous value of a received optical power characteristic corresponding with said received optical signal, the function being selected such that the effect of nonlinearity of the optical channel is mitigated;
at least one phase-modulation means arranged to multiply said received electrical signal by said phase modulation to produce a phase-modulated received signal; and
a signal decoder adapted to recover the transmitted information from the phase-modulated received signal.

15. The receiver of claim 14 wherein the optical detector comprises an optical filter arranged to suppress components of the received optical signal associated with an undesired optical sideband thereof.

16. A method of transmitting information over a nonlinear optical channel, comprising the steps of:
receiving a digital data input sequence;
generating an electrical information signal comprising a plurality of closely spaced subcarriers in a frequency domain, and which encodes the digital data input sequence;
generating a pre-compensated electrical signal by multiplying the electrical information signal with a phase modulation which is a first function of an instantaneous value of a transmitted optical signal power corresponding with the electrical information signal, the first function being selected such that the effect of nonlinearity of the optical channel is mitigated; and
modulating an optical source with the pre-compensated electrical signal to generate a corresponding pre-compensated transmitted optical signal.

17. The method of claim 16 wherein the step of generating the electrical information signal comprises:
mapping the digital data input sequence to a series of symbol values, each of which corresponds with one or more bits of the digital data modulated onto one of said plurality of sub-carriers; and
applying a frequency/time transformation to generate a corresponding time sequence of signal values.

18. The method of claim 17 wherein the step of generating the electrical information signal is performed in accordance with an orthogonal frequency division multiplexing (OFDM) method.

19. The method of claim 16 further comprising the steps of:
detecting the transmitted optical signal after propagation over the nonlinear optical channel to produce a corresponding received time-varying electrical signal;
determining a further phase modulation which is a second function of an instantaneous value of an optical power characteristic corresponding with said received signal;
applying said further phase modulation to said received electrical signal to produce a phase-modulated received signal; and
recovering the transmitted information from the phase-modulated received signal,
wherein said second function is selected such that the further phase modulation further mitigates the effect of the non-linearity of the optical channel on the transmitted optical signal.

20. The method of claim 19 wherein the step of modulating the optical source is performed so as to generate a transmitted optical signal comprising at least an optical sideband and an optical carrier component, and wherein the step of detecting comprises optically filtering the optical signal to suppress components associated with an undesired optical sideband thereof.

21. The method of claim 19 further comprising the step of optimizing parameters of the first and second functions in order to provide improved overall non-linear compensation, as compared with compensation by the first function or second function alone.

22. The method of claim 16 wherein the first function of optical power is a linear function, whereby the phase modulation consists of a phase shift which is proportional to instantaneous transmitted optical power.

23. The method of claim 16 which comprises a step of limiting a bandwidth of the phase modulation applied to the optical source.

24. The method of claim 23 wherein the step of limiting the bandwidth of the phase modulation comprises applying an analog or digital filter.

25. The method of claim 23 wherein limiting the bandwidth of the phase modulation comprises excluding a contribution of optical carrier power from the transmitted optical signal power employed in the step of generating the pre-compensated electrical signal.

26. A transmitter for use in transmitting information over a non-linear optical channel, the transmitter comprising:
- a digital data input port;
- a signal generator, adapted to generate an electrical information signal comprising a plurality of closely-spaced sub-carriers in a frequency domain, and which encodes a digital data sequence received at the digital data input port;
- means for generating a precompensated electrical signal by multiplying the electrical information signal with a phase modulation which is a function of an instantaneous value of a transmitted optical power characteristic corresponding with said electrical information signal, the function being selected such that the effect of non-linearity of the optical channel is mitigated;
- an optical source for generating an optical carrier wave; and
- an optical modulator arranged to apply the pre-compensated electrical signal to the optical carrier wave.

27. The transmitter of claim 26 wherein the means for generating a precompensated electrical signal is adapted to compute a phase shift which is proportional to instantaneous transmitted optical power.

28. The transmitter of claim 26 wherein the means for generating a precompensated electrical signal is adapted to limit a bandwidth of the phase modulation.

* * * * *